(12) United States Patent
Mieda

(10) Patent No.: US 11,201,578 B2
(45) Date of Patent: Dec. 14, 2021

(54) MOTOR CONTROL SYSTEM

(71) Applicants: Kabushiki Kaisha Toshiba, Tokyo (JP); Toshiba Electronic Devices & Storage Corporation, Tokyo (JP)

(72) Inventor: Akihisa Mieda, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/787,533

(22) Filed: Feb. 11, 2020

(65) Prior Publication Data
US 2021/0013824 A1  Jan. 14, 2021

(30) Foreign Application Priority Data

Jul. 11, 2019  (JP) .............................. JP2019-129134

(51) Int. Cl.
| | | |
|---|---|---|
| H02P 6/00 | (2016.01) |
| H02P 27/08 | (2006.01) |
| H02M 7/48 | (2007.01) |
| H02P 21/22 | (2016.01) |
| H02P 6/28 | (2016.01) |
| H02P 29/40 | (2016.01) |
| H02P 6/20 | (2016.01) |
| H02P 23/00 | (2016.01) |

(52) U.S. Cl.
CPC .............. *H02P 27/08* (2013.01); *H02M 7/48* (2013.01); *H02P 6/20* (2013.01); *H02P 6/28* (2016.02); *H02P 21/22* (2016.02); *H02P 23/00* (2013.01); *H02P 29/40* (2016.02)

(58) Field of Classification Search
CPC .. H02P 27/08; H02P 29/40; H02P 6/20; H02P 23/00; H02P 7/04; H02P 29/027; H02P 29/032; H02P 7/29; H02P 6/085; H02M 7/48
See application file for complete search history.

(56) References Cited

U.S. PATENT DOCUMENTS

2020/0235692 A1*  7/2020  Murata ................... H02P 27/08

FOREIGN PATENT DOCUMENTS

| JP | 2003-189670 A | 7/2003 |
| JP | 2005-094925 A | 4/2005 |
| JP | 2007-166695 A | 6/2007 |
| JP | 2010-284018 A | 12/2010 |

* cited by examiner

*Primary Examiner* — Karen Masih
(74) *Attorney, Agent, or Firm* — Allen & Overy LLP

(57) ABSTRACT

According to an embodiment, a motor control system includes an inverter, a PWM generation circuit, a shunt resistor, and a current detection circuit. Before the starting of the motor, at least one of all the low side transistors is turned on for a first period and detection of a first detection current flowing through the shunt resistor is performed. When the first detection current is detected, it is judged that the motor is rotating abnormally, and the rotation number of the motor is calculated based on the waveform of the first detection current. When the first detection current is not detected, it is judged that the motor is being stopped.

12 Claims, 20 Drawing Sheets

MOTOR CONTROL SYSTEM

CROSS REFERENCE TO RELATED APPLICATION

This application is based upon and claims the benefit of priority from the prior Japanese Patent Application No. 2019-129134, filed on Jul. 11, 2019, the entire contents of which are incorporated herein by reference.

FIELD

The embodiments described herein relate to a motor control system.

BACKGROUND

Motors have been mounted on machines in many fields including industrial machines and consumer machines. It is considerably important to grasp the rotation states of the motors at starting, driving, and stopping. It is also considerably important to detect the abnormal rotation of the motors before starting.

Motor control systems have been required to reduce the number of parts to cut down on the system cost. In response to the requirement, motors such as a three-shunt resistor type brushless/sensorless three-phase motor that can detect a U-phase current, a V-phase current, and a W-phase current individually have been used in many fields, for example. In order to further cut down on the system cost, motors such as a one-shunt resistor type brushless/sensorless three-phase motor have been developed, for example.

Since the three-shunt resistor type enables individual detection of the U-phase current, the V-phase current, and the W-phase current, it is possible to grasp the rotation states at starting, driving, and stopping and to detect the abnormal rotation of the motor before starting. Against this, the one-shunt resistor type is also required to detect the abnormal rotation of the motor before starting.

DETAILED DESCRIPTION

Figure 1:
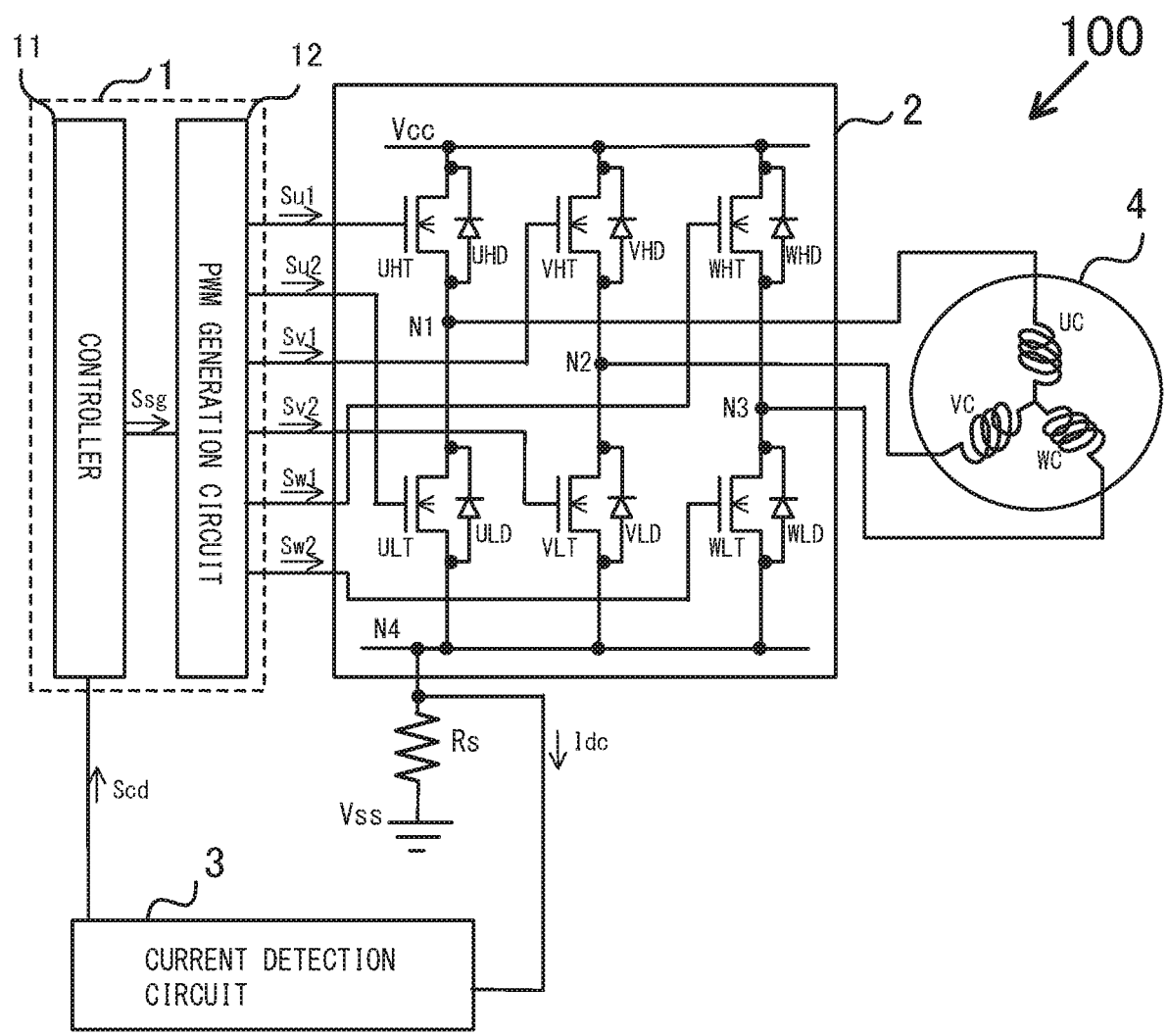
FIG. 1 is a circuit diagram showing a motor control system according to a first embodiment.

According to an embodiment, a motor control system includes an inverter, a PWM generation circuit, a shunt resistor, and a current detection circuit. The inverter includes a plurality of high side transistors and a plurality of low side transistors and supplies power to the motor to rotate the motor. The PWM generation circuit generates a PWM signal for controlling the ON/OFF operation of each of the high side transistors and the ON/OFF operations of the low side transistors and outputs the PWM signal to the inverter. In the shunt resistor, one end is connected to a plurality of low potential side terminals of the low side transistors, and the other end is connected to a ground potential. The current detection circuit detects currents flowing through the shunt resistor. Before the starting of the motor, at least one of all the low side transistors is turned on for a first period and detection of a first detection current flowing through the shunt resistor is performed. When the first detection current is detected, it is judged that the motor is rotating abnormally, and the rotation number of the motor is calculated based on the waveform of the first detection current. When the first detection current is not detected, it is judged that the motor is being stopped.

In addition, a plurality of embodiments are described below with reference to the drawings. In the drawings, the same reference signs represent the same or similar portions.

A motor control system according to a first embodiment is described with reference to the drawings. FIG. 1 is a circuit diagram showing the motor control system.

In the first embodiment, before the starting of the motor, the detection current flowing through the shunt resistor is detected by turning on at least one of the U-phase/V-phase/ W-phase transistors on the low side for a predetermined period to judge whether there is the abnormal rotation of the motor, and the rotation number of the abnormal rotation of the motor is calculated based on the detection current.

As shown in FIG. 1, a motor control system 100 is provided with a one-shunt type brushless/sensorless three-phase motor and is mounted on a machine including an industrial machine and a consumer machine. The motor control system 100 includes a microcontroller 1, an inverter 2, a current detection circuit 3, a motor 4, and a shunt resistor Rs. For example, the motor control system 100 is applied to an air conditioner with the motor 4 mounted on an outdoor unit.

The microcontroller 1 integrally controls the entirety of the motor control system 100. The microcontroller 1 includes a controller 11 and a PWM generation circuit 12.

At starting, driving, stopping, and before starting, the microcontroller 1 receives current detection information detected by the current detection circuit 3 as a current detection signal Scd. The microcontroller 1 generates a control signal Ssg based on the current detection signal Scd and outputs the generated control signal Ssg to the PWM generation circuit 12.

The PWM generation circuit 12 generates a triangle wave (also referred to as a reference carrier or a carrier wave) based on the control signal Ssg, generates a control signal Su1, a control signal Su2, a control signal Sv1, a control signal Sv2, a control signal Sw1, and a control signal Sw2 controlling the inverter 2 based on the triangle wave and outputs the generated control signals to the inverter 2. The control signal Su1, the control signal Su2, the control signal Sv1, the control signal Sv2, the control signal Sw1, and the control signal Sw2 are pulse width modulation (PWM) signals.

The motor 4 includes a coil UC, a coil VC, a coil WC, and a rotor (not illustrated). The coil UC is a U-phase coil, the coil VC is a V-phase coil, and the coil WC is a W-phase coil. The motor 4 is a one-shunt type brushless/sensorless three-phase motor.

The inverter 2 includes a transistor UHT, a transistor ULT, a transistor VHT, a transistor VLT, a transistor WHT, a transistor WLT, a diode UHD, a diode ULD, a diode VHD, a diode VLD, a diode WHD, and a diode WLD.

The transistor UHT is a U-phase high side transistor. The transistor UHT is an N-channel MOS transistor (also referred to as an N-channel MOSFET). In the transistor UHT, a drain is connected to a power source Vcc, a source is connected to a node N1 (one end of the U-phase coil UC), the control signal Su1 is inputted to a gate, and ON/OFF operation of the transistor UHT is executed based on the control signal Su1. The transistor UHT is turned on when the control signal Su1 is in an enable state (high level) and is turned off when the control signal Su1 is in a disable state (low level). In the diode UHD, a cathode is connected to the drain of the transistor UHT, and an anode is connected to the source of the transistor UHT. The diode UHD is a reflux diode.

The transistor ULT is a U-phase low side transistor. The transistor ULT is an N-channel MOS transistor. In the transistor ULT, a drain (high potential side terminal) is connected to the node N1 (one end of the U-phase coil UC), a source (low potential side terminal) is connected to a node N4 (one end of a shunt resistor Rs), the control signal Su2 is inputted to a gate (control terminal), and ON/OFF operation of the transistor ULT is executed based on the control signal Su2. The transistor ULT is turned on when the control signal Su2 is in the enable state (high level) and is turned off when the control signal Su2 is in the disable state (low level). In the diode ULD, a cathode is connected to the drain of the transistor ULT, and an anode is connected to the source of the transistor ULT. The diode ULD is a reflux diode.

The transistor VHT is a V-phase high side transistor. The transistor VHT is an N-channel MOS transistor. In the transistor VHT, a drain is connected to the power source Vcc, a source is connected to a node N2 (one end of the V-phase coil VC), the control signal Sv1 is inputted to a gate, and ON/OFF operation of the transistor VHT is executed based on the control signal Sv1. The transistor VHT is turned on when the control signal Sv1 is in the enable state (high level) and is turned off when the control signal Sv1 is in the disable state (low level). In the diode VHD, a cathode is connected to the drain of the transistor VHT, and an anode is connected to the source of the transistor VHT. The diode VHD is a reflux diode.

The transistor VLT is a V-phase low side transistor. The transistor VLT is an N-channel MOS transistor. In the transistor VLT, a drain (high potential side terminal) is connected to the node N2 (one end of the V-phase coil VC), a source (low potential side terminal) is connected to the node N4 (one end of the shunt resistor Rs), the control signal Sv2 is inputted to a gate (control terminal), and ON/OFF operation of the transistor VLT is executed based on the control signal Sv2. The transistor VLT is turned on when the control signal Sv2 is in the enable state (high level) and turned off when the control signal Sv2 is in the disable state (low level). In the diode VLD, a cathode is connected to the drain of the transistor VLT, and an anode is connected to the source of the transistor VLT. The diode VLD is a reflux diode.

The transistor WHT is a W-phase high side transistor. The transistor WHT is an N-channel MOS transistor. In the transistor WHT, a drain is connected to the power source Vcc, a source is connected to a node N3 (one end of the W-phase coil WC), the control signal Sw1 is inputted to a gate, and ON/OFF operation of the transistor WHT is executed based on the control signal Sw1. The transistor WHT is turned on when the control signal Sw1 is in the enable state (high level) and is turned off when the control signal Sw1 is in the disable state (low level). In the diode WHD, a cathode is connected to the drain of the transistor WHT, and an anode is connected to the source of the transistor WHT. The diode WHD is a reflux diode.

The transistor WLT is a W-phase low side transistor. The transistor WLT is an N-channel MOS transistor. In the transistor WLT, a drain (high potential side terminal) is connected to the node N3 (one end of the W-phase coil UC), a source (low potential side terminal) is connected to the node N4 (one end of the shunt resistor Rs), the control signal Sw2 is inputted to a gate (control terminal), and ON/OFF operation of the transistor WLT is executed based on the control signal Sw2. The transistor WLT is turned on when the control signal Sw2 is in the enable state (high level) and is turned off when the control signal Sw2 is in the disable state (low level). In the diode WLD, a cathode is connected to the drain of the transistor WLT, and an anode is connected to the source of the transistor WLT. The diode WLD is a reflux diode.

The inverter 2 executes ON/OFF operation of the transistor UHT, the transistor ULT, the transistor VHT, the transistor VLT, the transistor WHT, and the transistor WLT based on the control signal Su1, the control signal Su2, the control signal Sv1, the control signal Sv2, the control signal Sw1, and the control signal Sw2 to supply power to the motor 4, and thereby rotates the motor 4.

In the shunt resistor Rs, one end is connected to the source (low potential side terminal) of the transistor ULT, the source (low potential side terminal) of the transistor VLT, and the source (low potential side terminal) of the transistor WLT, and the other end is connected to the ground potential Vss. The shunt resistor Rs makes a detection current Idc combining the current flowing through the U-phase, the current flowing through the V-phase, and the current flowing through the W-phase flow toward the ground potential Vss.

In the current detection circuit 3, a detection terminal is connected to one end side (node N4) of the shunt resistor Rs to detect the detection current Idc flowing through the shunt resistor Rs. The current detection circuit 3 analog-digital converts the detection current Idc, which is an analog current, and outputs the analog-digital converted detection current to the controller 11 as the current detection signal Scd. The current detection circuit 3 detects the U-phase current, the V-phase current, and the W-phase current flowing at starting, driving, and stopping and detects the U-phase current, the V-phase current, and the W-phase current flowing due to the abnormal rotation of the motor 4 before starting.

The abnormal rotation of the motor before starting will be described with reference to FIG. 2.

Figure 2:
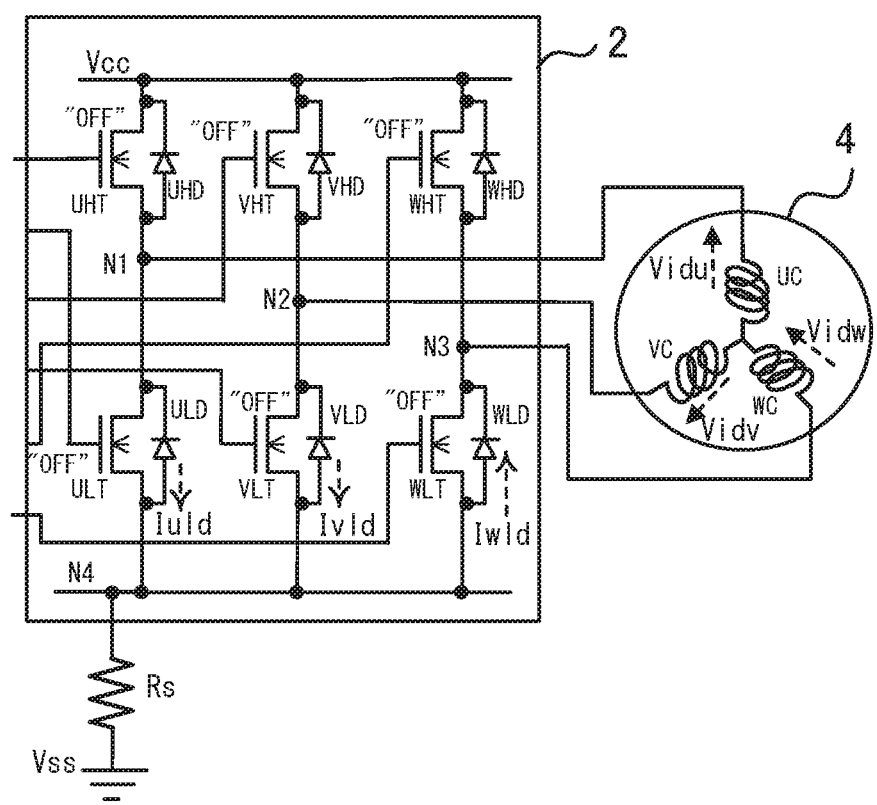
FIG. 2 is an explanatory diagram of the abnormal rotation of a motor before starting.

As shown in FIG. 2, when the abnormal rotation of the motor 4 before starting occurs, the rotation of the motor 4 causes an induced voltage Vidu to be generated in the U-phase coil UC, an induced voltage Vidv to be generated in the V-phase coil VC, and an induced voltage Vidw to be generated in the W-phase coil WC. In this case, the transistor UHT, the transistor ULT, the transistor VHT, the transistor VLT, the transistor WHT, and the transistor WLT are all turned off. The induced voltage Vidu causes a current Iuld to flow through the diode ULD as a reflux diode, the induced voltage Vidv causes a current Ivld to flow through the diode VLD as a reflux diode, and the induced voltage Vidw causes a current Iwld to flow through the diode WLD as a reflux diode, respectively.

The case where the abnormal rotation in a forward rotation direction of the motor 4 before starting occurs will be described with reference to FIG. 3A.

Figure 3A:
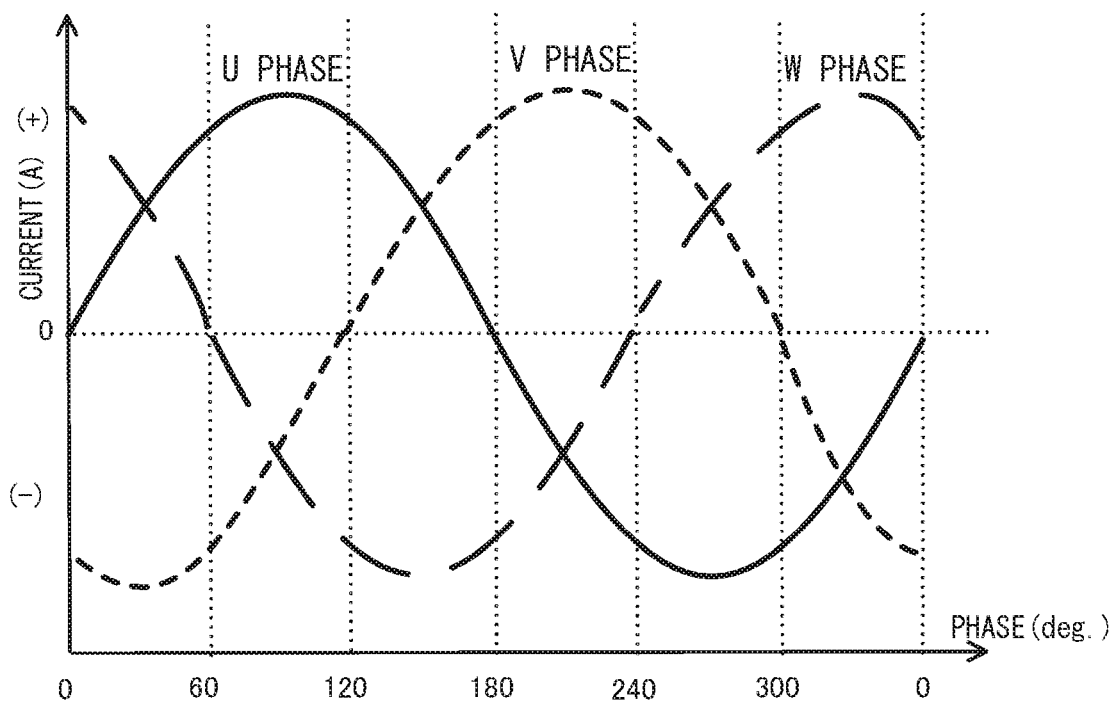
FIG. 3A is a diagram showing currents flowing through phases in a forward rotation direction.

As shown in FIG. 3A the U-phase current → the V-phase current → the W-phase current sequentially flow at intervals of 120 degrees of phase difference, similarly to the normal operation.

The case where the abnormal rotation in an inverse rotation direction of the motor 4 before starting occurs will be described with reference to FIG. 3B.

Figure 3B:
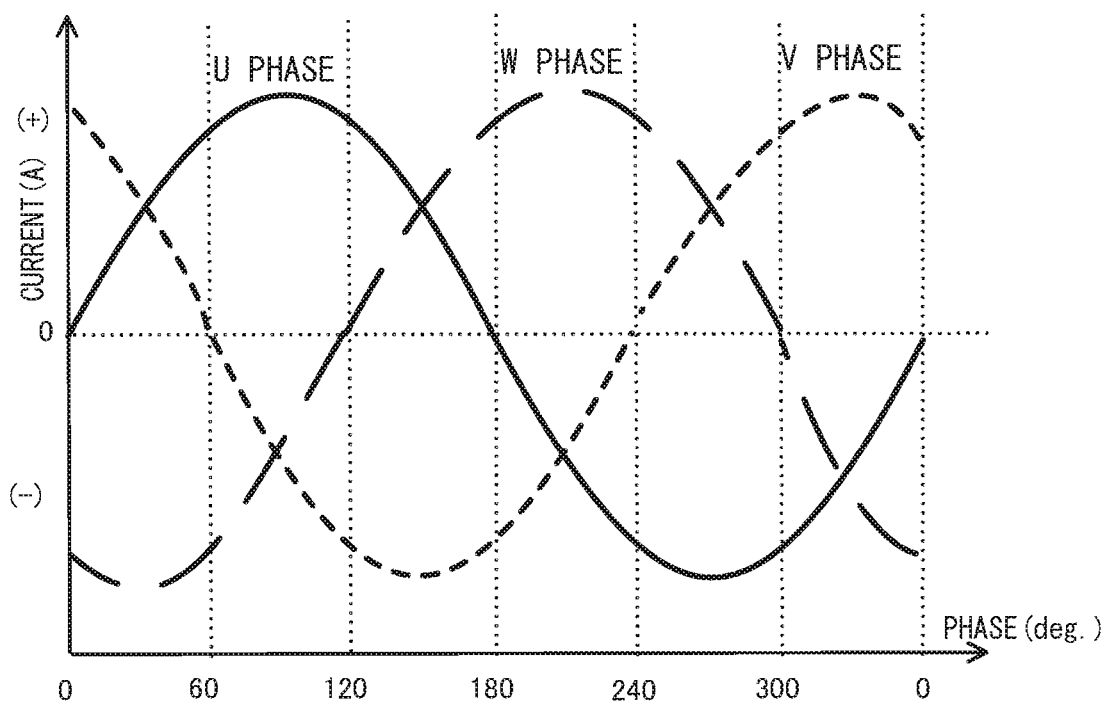
FIG. 3B is a diagram showing currents flowing through the phases in an inverse rotation direction.

As shown in FIG. 3B, the U-phase current → the W-phase current → the V-phase current sequentially flow at intervals of 120 degrees of phase difference, in the inverse direction of the normal operation.

Figure 4:
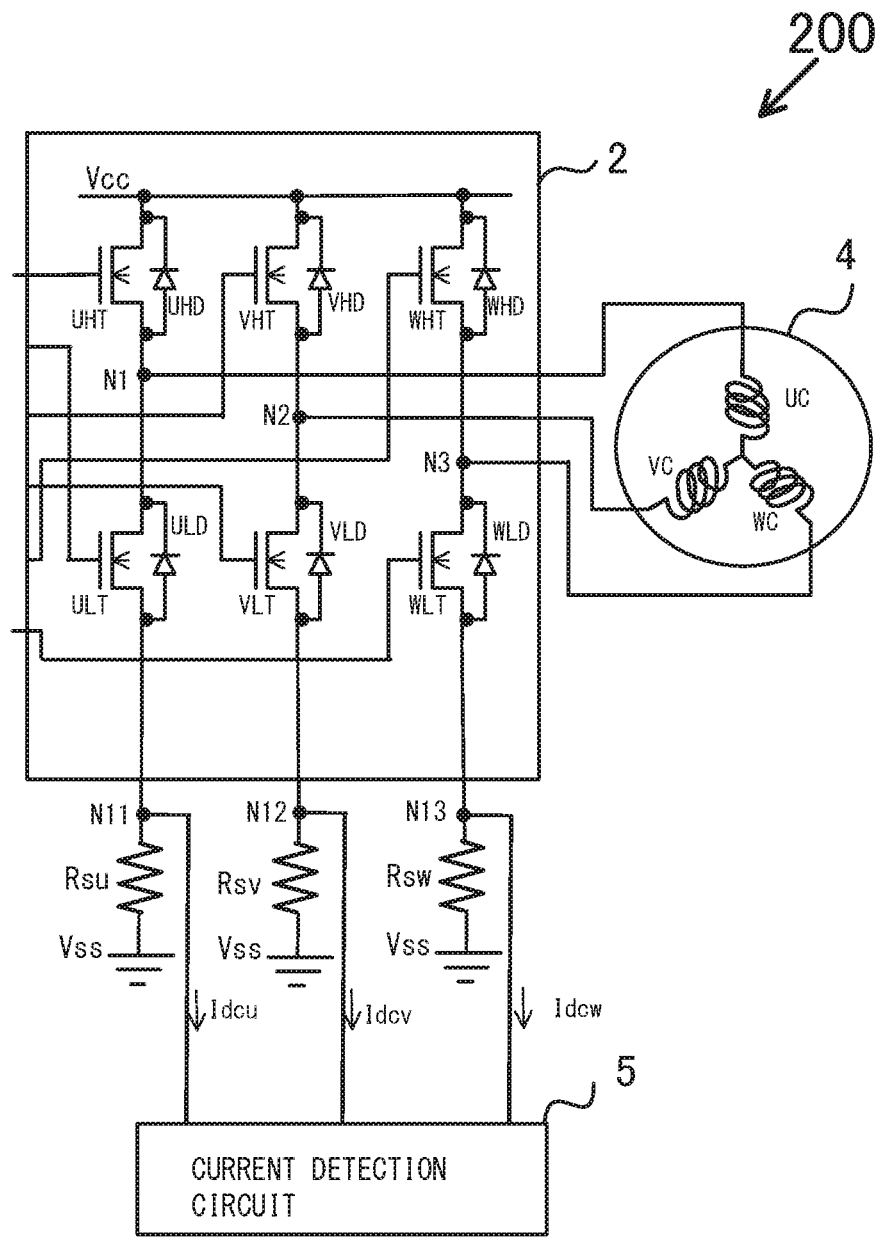
FIG. 4 is a circuit diagram showing a motor control system of a comparative example.
Figure 5:
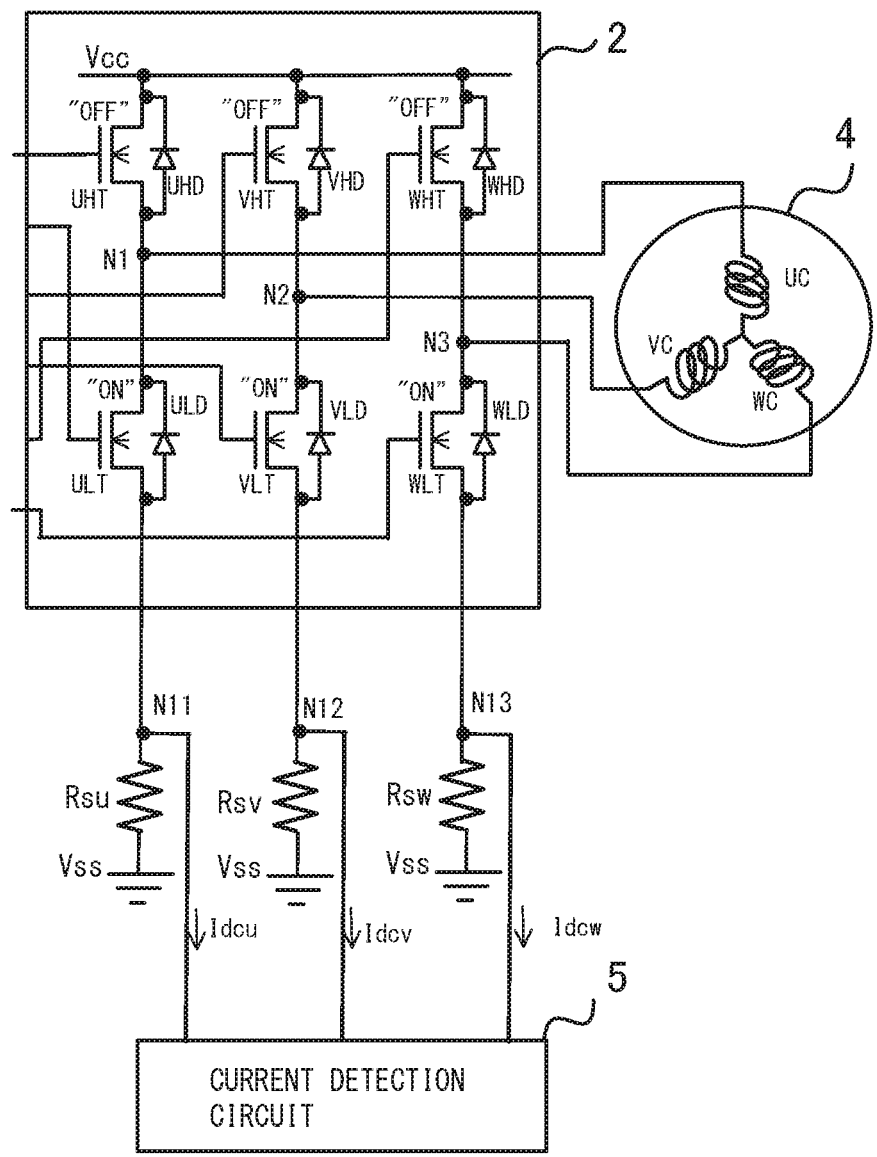
FIG. 5 is an explanatory diagram of detection of the abnormal rotation of the motor before starting in the motor control system of the comparative example.

Next, a motor control system of a comparative example will be described with reference to FIGS. 4 and 5. FIG. 4 is a circuit diagram showing the motor control system of the comparative example. FIG. 5 is an explanatory diagram of detection of the abnormal rotation of a motor before starting in the motor control system of the comparative example. Comparing with the motor control system 100 of the first embodiment, the number of the shunt resistors in a motor control system 200 of the comparative example is changed to three. Comparing with the motor control system 100 of the first embodiment, descriptions of the same portions are omitted, and only the different points will be described with reference to the drawings.

As shown in FIG. 4, the motor control system 200 of the comparative example includes the inverter 2, the motor 4, a current detection circuit 5, a shunt resistor Rsu, a shunt resistor Rsv, and a shunt resistor Rsw.

In the shunt resistor Rsu, one end is connected to a source (low potential side terminal, node N11) of the transistor ULT, and the other end is connected to the ground potential Vss. The shunt resistor Rsu makes a detection current Idcu flowing through the U-phase flow toward the ground potential Vss.

In the shunt resistor Rsv, one end is connected to a source (low potential side terminal, node N12) of the transistor VLT, and the other end is connected to the ground potential Vss. The shunt resistor Rsv makes a detection current Idcv flowing through the V-phase flow toward the ground potential Vss.

In the shunt resistor Raw, one end is connected to a source (low potential side terminal, node N13) of the transistor WLT, and the other end is connected to the ground potential Vss. The shunt resistor Rsw makes a detection current Idcw flowing through the W-phase flow toward the ground potential Vss.

The current detection circuit 5 detects the detection current Idcu flowing from one end side of the shunt resistor Rsu to the U-phase, the detection current Idcv flowing from one end side of the shunt resistor Rsv to the V-phase, and the detection current Idcw flowing from one end side of the shunt resistor Rsw to the W-phase, individually.

As shown in FIG. 5, when detecting the abnormal rotation of the motor 4 before starting, the motor control system 200 of the comparative example detects the U-phase current as the detection current Idcu, detects the V-phase current as the detection current Idcv, and detects the W-phase current as the detection current Idcw by turning on the transistor ULT, the transistor VLT, and the transistor WLT as the low side transistors for a predetermined period with the transistor UHT, the transistor VHT, and the transistor WHT as the high side transistors turned off.

When the detection current Idcu, the detection current Idcv, and the detection current Idcw are detected, the motor control system 200 of the comparative example judges that the motor 4 is rotating abnormally. When the detection current Idcu, the detection current Idcv, and the detection current Idcw are not detected, it is judged that the motor 4 is being stopped.

The rotation number is calculated based on a current waveform of the detection current Idcu, a current waveform of the detection current Idcv and a current waveform of the detection current Idcw. For example, the rotation number of the abnormal rotation of the motor 4 is calculated based on a zero cross crossing interval (interval from 0 degree to 180 degree of phase).

The rotation direction of the motor is judged based on the order of (or phase difference between) the current waveform of the detection current Idcu, the current waveform of the detection current Idcv, and the current waveform of the detection current Idcw.

Figure 6:
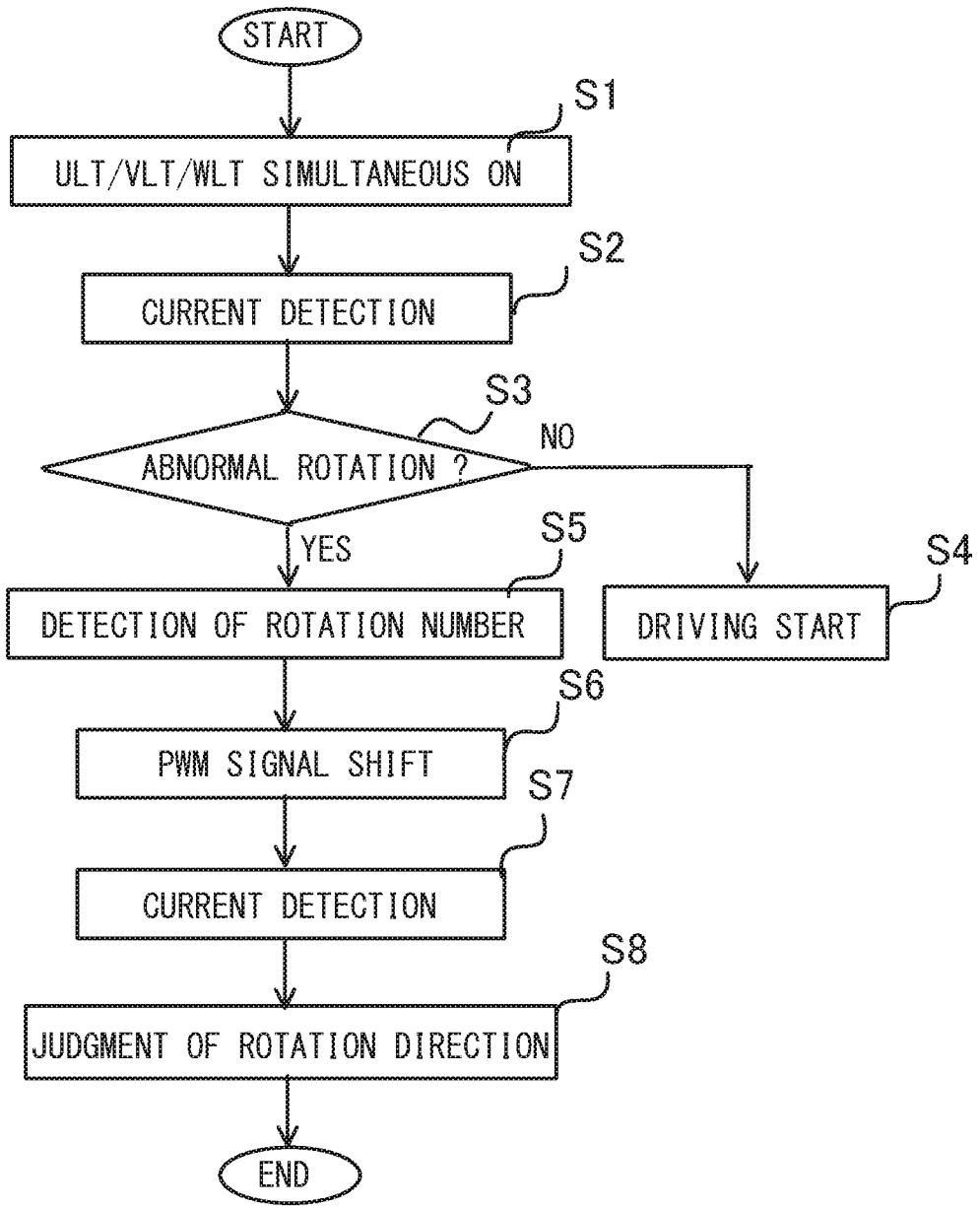
FIG. 6 is a flowchart showing detection processing of the abnormal rotation of the motor before starting according to the first embodiment.

Next, detection processing of the abnormal rotation of the motor before starting will be described with reference to FIG. 6. FIG. 6 is a flowchart showing the detection processing of the abnormal rotation of the motor. In this case, the motor control system 100 is applied to an air conditioner, and the motor 4 is mounted on an outdoor unit. The case where a fan of the outdoor unit is rotated due to an external cause (such as wind), and the motor 4 is being forced to rotate is expected.

As illustrated in FIG. 6, before the starting of the motor 4, the U-phase high side transistor/V-phase high side transistor/W-phase high side transistor are set to OFF state, and the U-phase low side transistor/V-phase low side transistor/W-phase low side transistor are set to ON state for a predetermined period.

Figure 7:
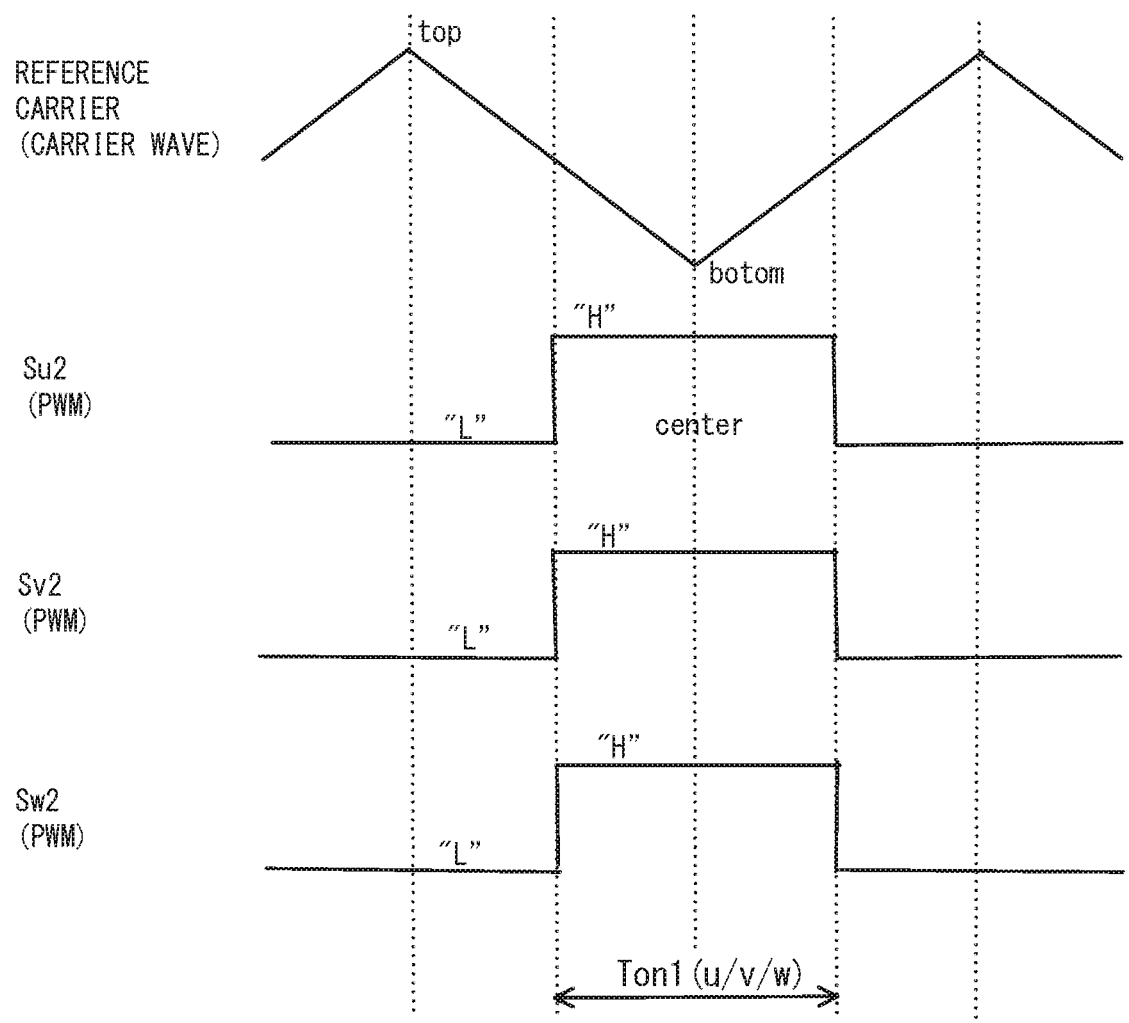
FIG. 7 is an explanatory diagram of the case where U-phase/V-phase/W-phase transistors on a low side are turned on simultaneously according to the first embodiment.

Specifically, as illustrated in FIG. 7, the control signal Su2/control signal Sv2/control signal Sv2 are set to the enable state for an ON period Ton1 (u/v/w) based on the reference carrier (triangle wave). The setting causes the transistor ULT/transistor VLT/transistor WLT to be turned on simultaneously (step S).

Figure 8:
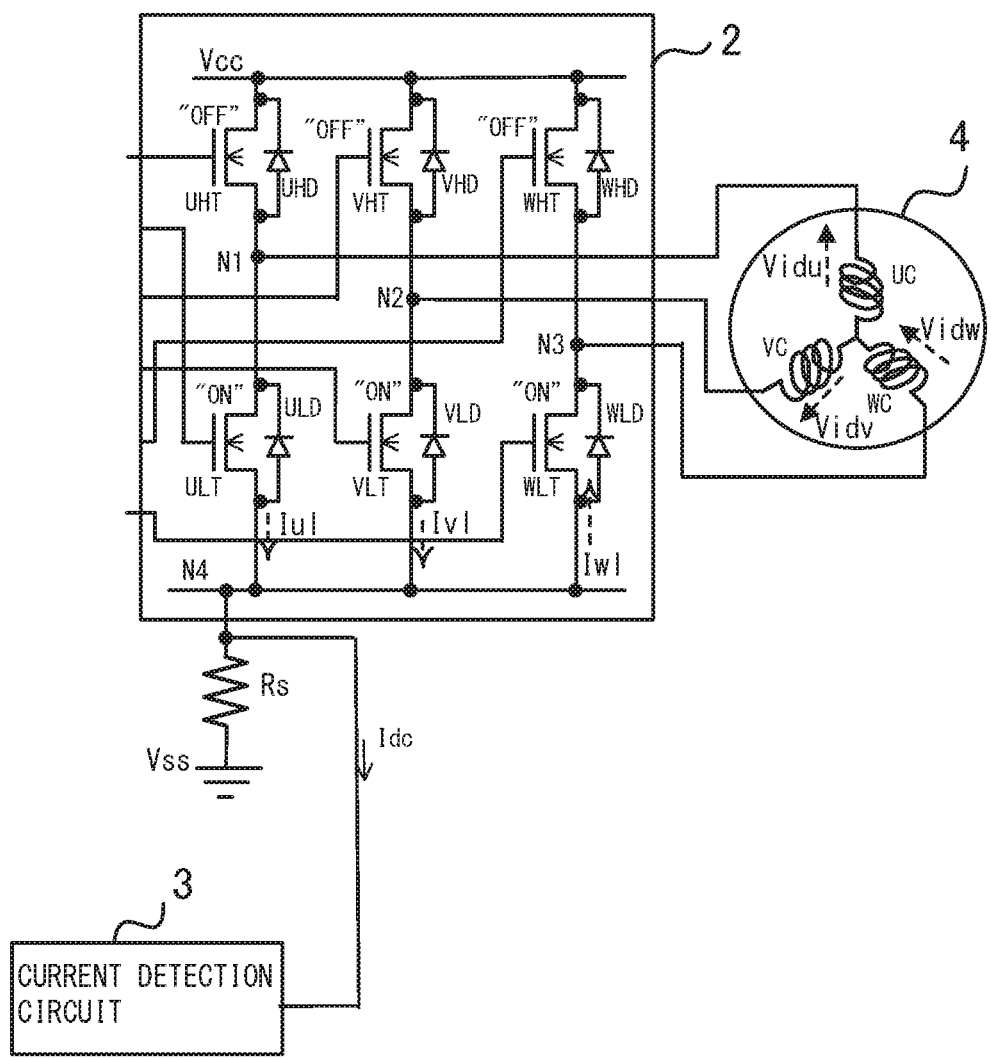
FIG. 8 is a diagram showing currents flowing through the U-phase/V-phase/W-phase transistors on the low side in the simultaneous ON state according to the first embodiment.

Next, as illustrated in FIG. 8, the detection current Idc as the combined current including the current Iu1 as the U-phase current, the current Iv1 as the V-phase current, and the current Iw1 as the W-phase current and flowing through the shunt resistor Rs in a period of the ON period Ton1 (u/v/w) is detected (step S2).

Subsequently, whether there is the abnormal rotation of the motor 4 is judged. Specifically, when the detection current Idc is not detected, it is judged that the motor 4 is being stopped, and when the detection current Idc is detected, it is judged that the motor 4 is rotating abnormally (step S3).

When it is judged that the motor 4 is being stopped, the motor control system 100 starts an operation start mode (step S4).

Figure 9:
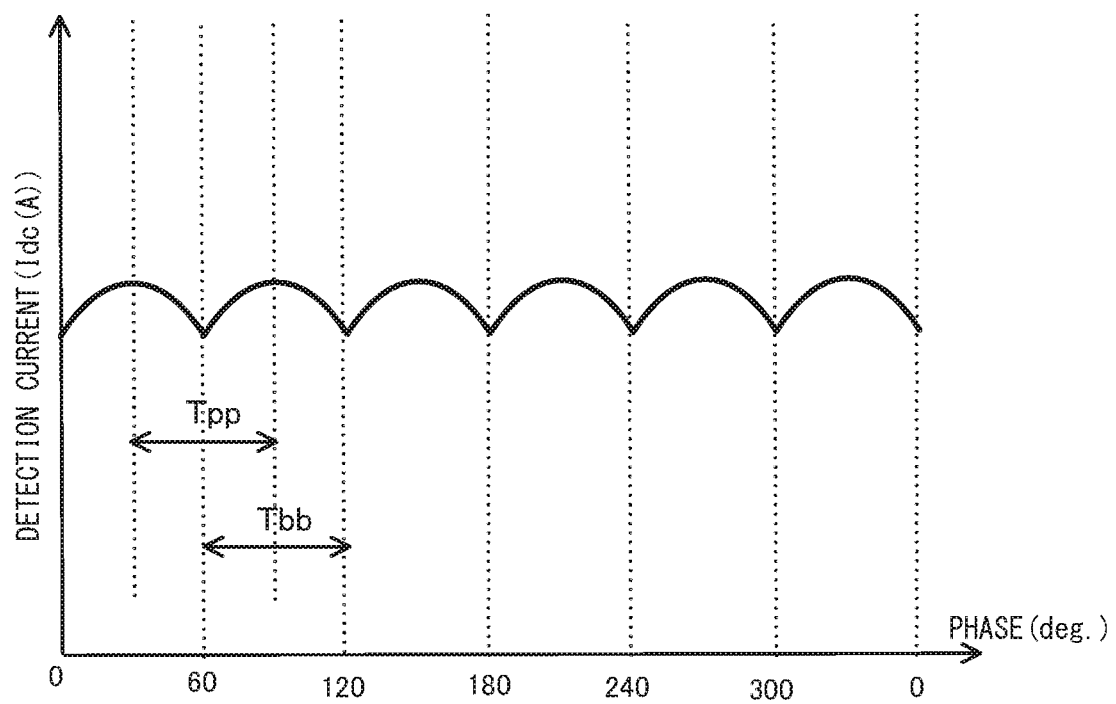
FIG. 9 is a diagram showing a waveform of a detection current in the simultaneous ON state of the U-phase/V-phase/W-phase transistors on the low side according to the first embodiment.

When it is judged that the motor 4 is rotating abnormally, the rotation number of the abnormal rotation of the motor 4 is calculated based on the waveform of the detection current Idc. As shown in FIG. 9, a bottom interval Tbb or a peak interval Tpp of the waveform of the detection current Idc as the combined current including the U-phase current/V-phase current/W-phase current is calculated, and the rotation number of the abnormal rotation of the motor 4 is calculated based on the calculation result. Specifically, the bottom interval Tbb or the peak interval Tpp has 60 degrees of phase, and six times of the bottom interval Tbb or the peak interval Tpp is a cycle time of the abnormal rotation of the motor 4. Thus, it is possible to calculate the rotation number (step S5).

There may be another method of judging whether there is the abnormal rotation of the motor and detecting the rotation number. At least one of or adjacent two of the transistor ULT/transistor VLT/transistor WLT may be turned on and detection of the detection current Idc flowing through the shunt resistor Rs may be performed.

The judging of whether there is the abnormal rotation of the motor 4 and the calculation of the rotation number of the abnormal rotation of the motor 4 in the first modification are described with reference to FIGS. 10 to 12.

Figure 10:
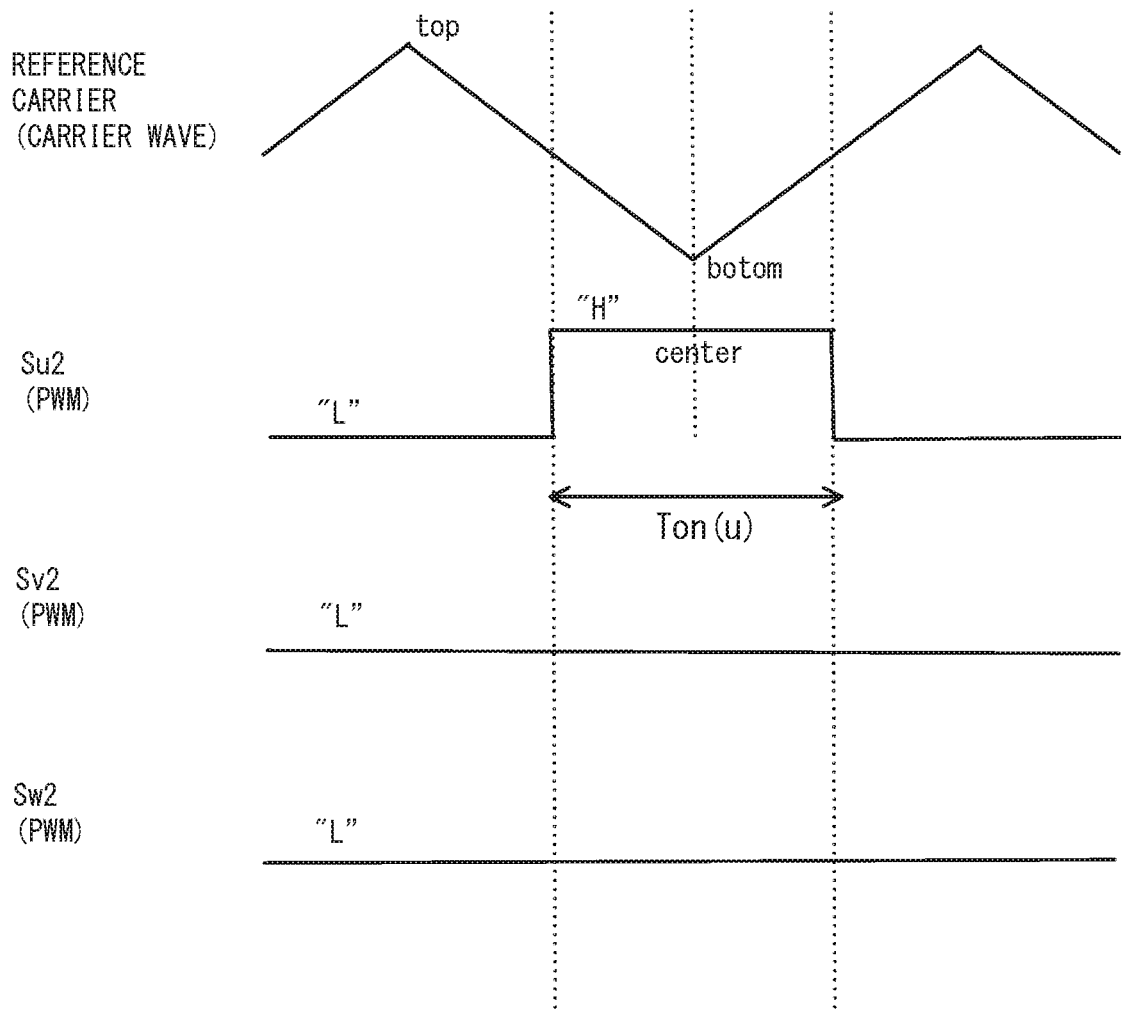
FIG. 10 is an explanatory diagram of the case where only the U-phase transistor on the low side is turned on in a first modification.

FIG. 10 is an explanatory diagram of the case where only the U-phase transistor on the low side is turned on. FIG. 11 is a diagram showing flowing currents. FIG. 12 is a diagram showing a waveform of the detection current in the first modification.

As shown in FIG. 10, the U-phase high side transistor/V-phase high side transistor/W-phase high side transistor are set to the OFF state, and only the U-phase low side transistor is set to the ON state for the ON period Ton(u).

Figure 11:
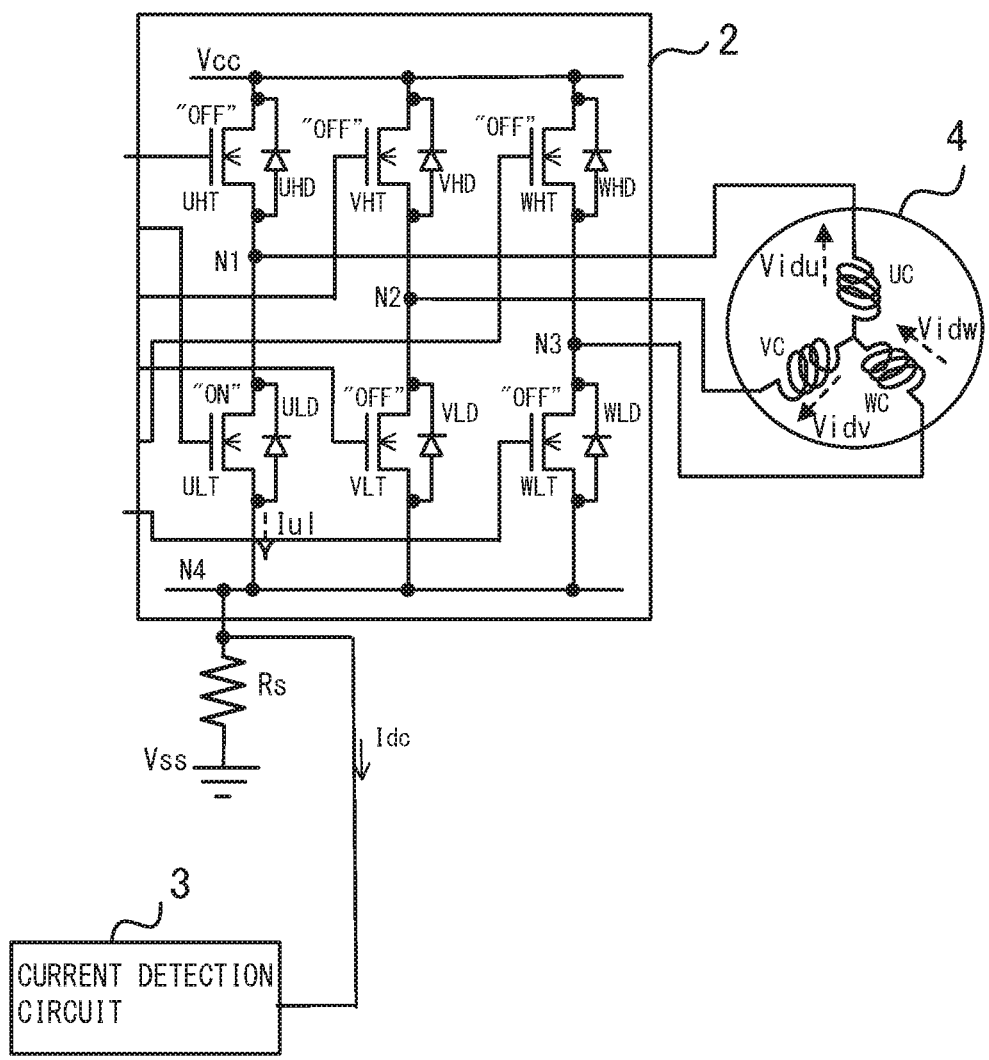
FIG. 11 is a diagram showing flowing currents in the first modification.

As shown in FIG. 11, the current Iu1 as the U-phase current is detected as the detection current Idc in the ON period Ton(u). In this process, the current Ivld flows through the diode VLD, and the current Iwld flows through the diode WLD. Since the current Iu1>>current Ivld, current Iwld, there is no need to take into consideration the current Ivld and the current Iwld.

Figure 12:
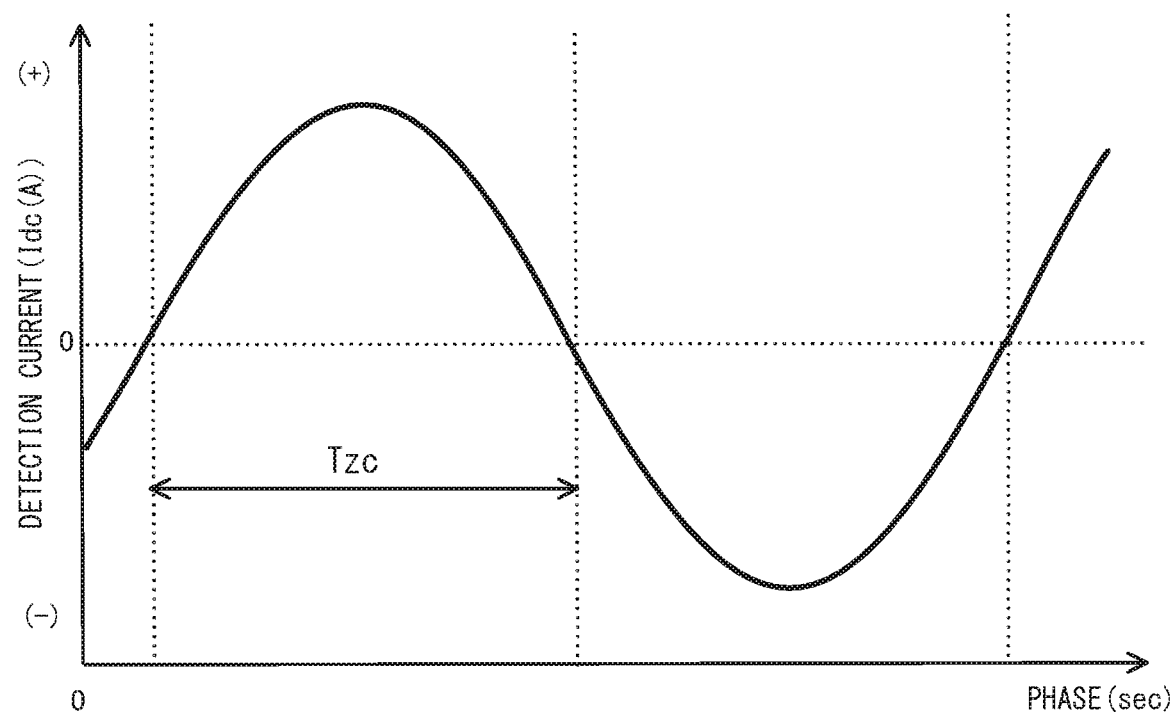
FIG. 12 is a diagram showing a waveform of a detection current in the first modification.

As illustrated in FIG. 12, the rotation number of the abnormal rotation of the motor 4 is calculated based on the waveform of the current Iu1 flowing through the U-phase.

For example, a zero cross crossing interval Tzc (180 degrees of phase) is calculated to calculate the rotation number.

Figure 13:
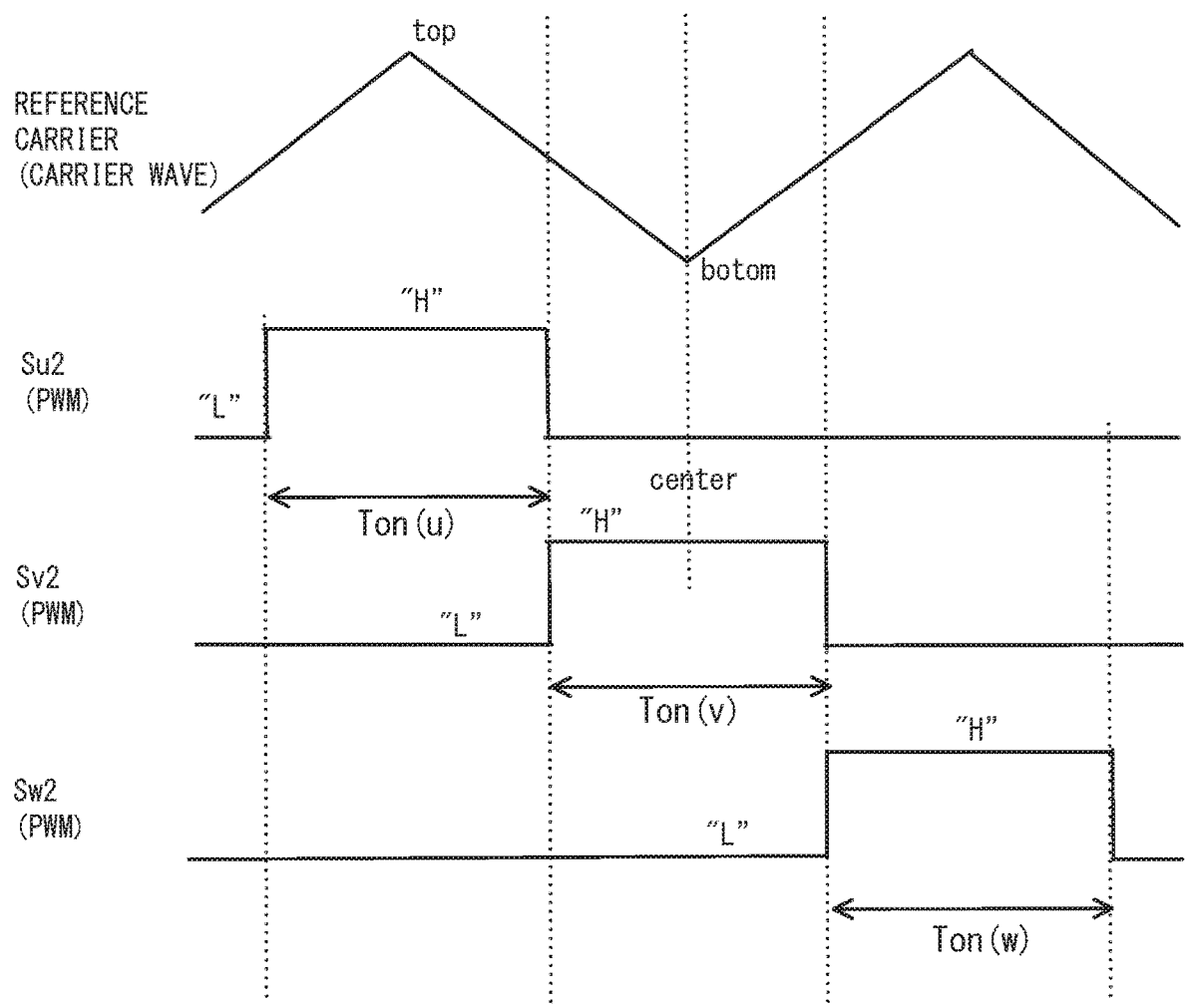
FIG. 13 is a diagram showing an example of shifting ON periods of the V-phase/W-phase transistors on the low side according to the first embodiment.

Next, as shown in FIG. 13, the U-phase high side transistor/V-phase high side transistor/W-phase high side transistor are set to the OFF state, and the ON periods of the U-phase low side transistor/V-phase low side transistor/W-phase low side transistor are set sequentially. Specifically the control signal Su2 is set to the enable state for the ON period Ton(u) to turn on the transistor ULT, the control signal Sv2 is set to the enable state for an ON period Ton(v) to turn on the transistor VLT immediately after the end of the ON period Ton(u), and the control signal Sw2 is set to the enable state for an ON period Ton(w) to turn on the transistor WLT immediately after the end of the ON period Ton(v) (step S6).

Subsequently, the current Idu flowing through the U-phase, the current Iv1 flowing through the V-phase, and the current Iw1 flowing through the W-phase are each detected as the detection current Idc flowing through the shunt resistor Rs (step S7).

The rotation direction of the abnormal rotation of the motor 4 is judged based on the current waveform of the current Iu1 flowing through the U-phase, the current waveform of the current Iv1 flowing through the V-phase, and the current waveform of the current Iw1 flowing through the W-phase. Specifically, the rotation direction is judged based on the order of the U-phase current, the V-phase current, and the W-phase current. When the order is U-phase current → V-phase current → W-phase current, it is judged that the abnormal rotation is in the forward rotation direction, and when the order is U-phase current → W-phase current → V-phase current, it is judged that the abnormal rotation is in the inverse rotation direction.

Alternatively, the rotation direction may be judged by obtaining the phase difference between the U-phase current, the V-phase current, and the W-phase current. For example, when the phase difference between the current waveform of the current Iu1 flowing through the U-phase and the current waveform of the current Iv1 flowing through the V-phase is 120 degrees, it is judged that the motor 4 is rotating abnormally in the forward rotation direction. When the phase difference between the current waveform of the current Iu1 flowing through the U-phase and the current waveform of the current Iv1 flowing through the V-phase is 240 degrees, it is judged that the motor 4 is rotating abnormally in the inverse direction. The rotation direction of the abnormal rotation of the motor 4 may be judged based on the current waveform of the current Iv1 flowing through the V-phase and the current waveform of the current Iw1 flowing through the W-phase, or current waveform of the current Iw1 flowing through the W-phase and the current waveform of the current Iu1 flowing through the U-phase (step S8).

Figure 14:
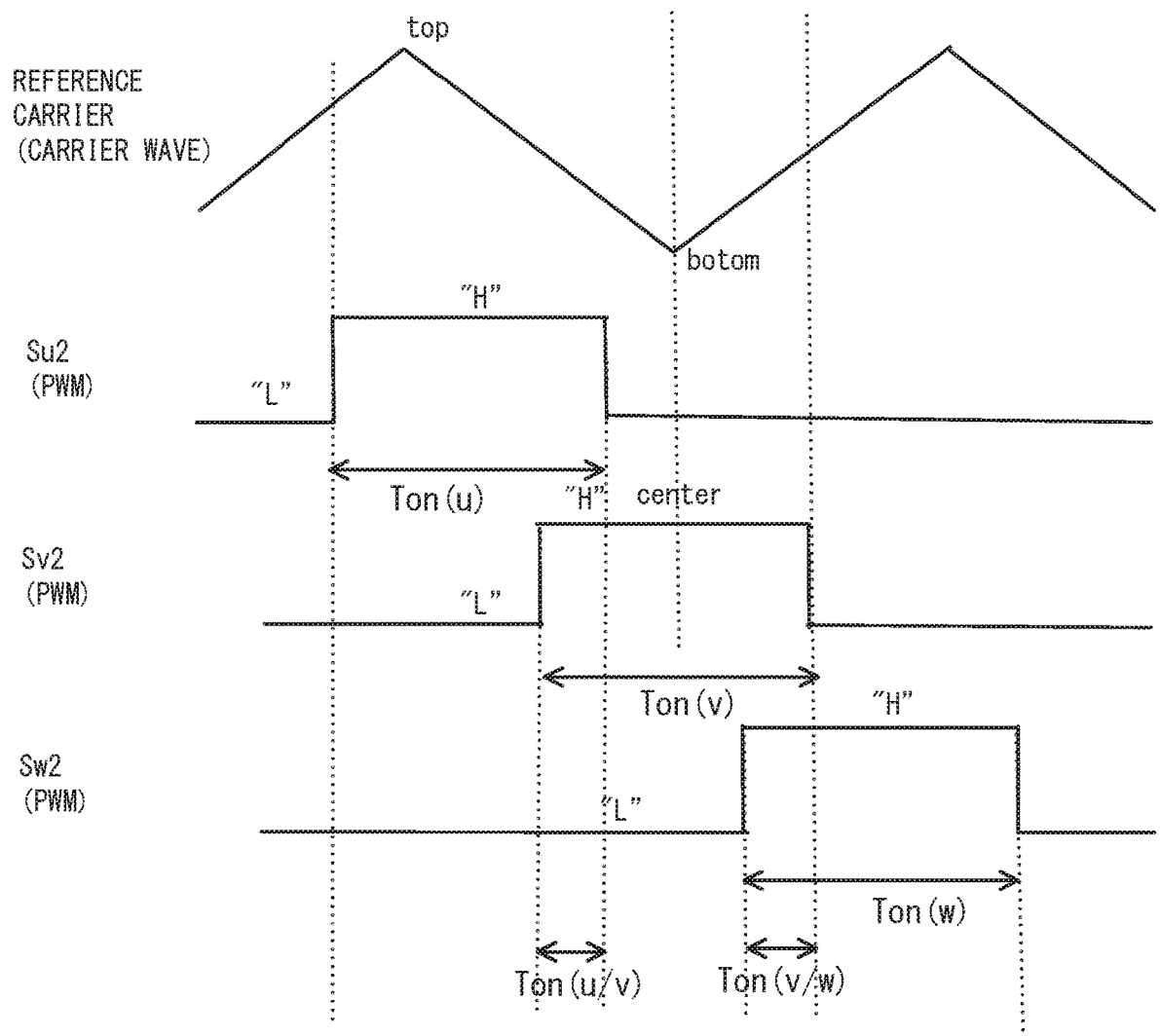
FIG. 14 is a diagram showing an example of shifting ON periods of the V-phase/W-phase transistors on the low side in a second modification.

Although the ON periods of the U-phase low side transistor/V-phase low side transistor/W-phase low side transistor are set to be sequential in the embodiment (see FIG. 13), the embodiment is not necessarily limited to the above case. For example, overlapped periods may be set like a second modification shown in FIG. 14.

For example, an ON period Ton(u/v) may be provided between the ON period Ton(u) and the ON period Ton(v), and an ON period Ton(v/w) may be provided between the ON period Ton(v) and the ON period Ton(w). This makes it possible to detect the detection current Idc flowing through the shunt resistor Rs in the ON period Ton(u/v) or the ON period Ton(v/w) and to judge the rotation direction of the abnormal rotation of the motor 4 based on the current waveform of the detection current Idc.

As described above, the motor control system 100 of the embodiment is provided with the microcontroller 1, the inverter 2, the current detection circuit 3, the motor 4, and the shunt resistor Rs. The motor 4 is a one-shunt type brushless/sensorless three-phase motor. The current detection circuit 3 detects the U-phase current, the V-phase current, and the W-phase current using the shunt resistor Rs. Before the starting of the motor 4, at least one of all the low side transistors is turned on for the ON period Ton1 and detection of the detection current Idc flowing through the shunt resistor Rs is performed. When the detection current Idc is detected, it is judged that the motor 4 is rotating abnormally, and the rotation number of the motor 4 is calculated based on the waveform of the detection current Idc. When the detection current Idc is not detected, it is judged that the motor 4 is being stopped. Before the starting of the motor 4, the current flowing through the U-phase low side transistor, the current flowing through the V-phase low side transistor, and the current flowing through the W-phase low side transistor are detected sequentially by turning on the U-phase low side transistor/V-phase low side transistor/W-phase low side transistor sequentially, and the rotation direction of the abnormal rotation of the motor 4 is judged based on the order of the current waveforms.

Thus, it is possible to precisely grasp the state of the motor 4 at starting, driving, and stopping and the abnormality of the motor 4 before starting, with the number of the parts of the motor control system 100 reduced.

Although the detection current Idc flowing through the shunt resistor Rs is detected by turning on the U-phase low side transistor/V-phase low side transistor/W-phase low side transistor simultaneously for a predetermined period, and the judgement of whether there is the abnormal rotation of the motor 4 based on the detection current Idc and the calculation of the rotation number of the motor 4 during the abnormal rotation are performed in the first embodiment, the embodiment is not necessarily limited to the method. For example, the detection current Idc flowing through the shunt resistor Rs may be detected by shifting the ON periods of the U-phase low side transistor/V-phase low side transistor/W-phase low side transistor sequentially, and the judgement of whether there is the abnormal rotation of the motor 4, the calculation of the rotation number of the motor 4 during the abnormal rotation, and the judgement of the direction of the abnormal rotation of the motor 4 may be simultaneously executed based on the detection current Idc flowing through each phase.

Figure 15:
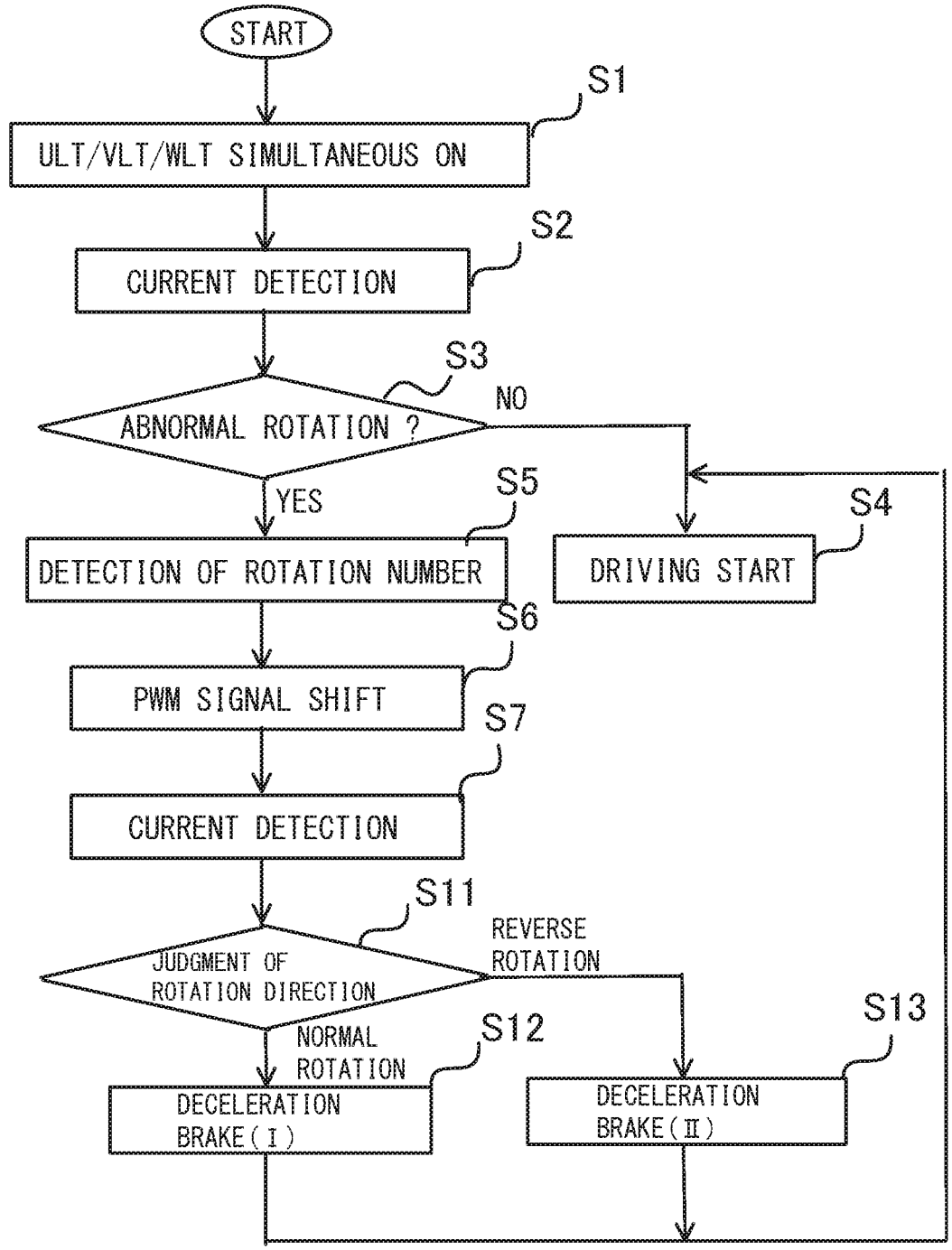
FIG. 15 is a flowchart showing deceleration brake processing of the abnormal rotation of a motor before starting according to a second embodiment.

A motor control system according to the second embodiment will be described with reference to the drawings. FIG. 15 is a flowchart showing deceleration brake processing of the abnormal rotation of a motor before starting.

In the second embodiment, when the abnormal rotation of the motor is detected before starting and it is judged that the abnormal rotation is in the forward rotation direction, a first deceleration brake is applied to stop the rotation of the motor. When it is judged that the abnormal rotation is in the inverse rotation direction, a second deceleration brake is applied to stop the rotation of the motor.

In the embodiment, the abnormal rotation of the motor before starting is stopped by using the motor control system 100 of the first embodiment.

Since steps S1 to steps S7 in the deceleration brake processing of the abnormal rotation of the motor before starting are similar to steps S1 to steps S7 in the detection processing of the abnormal rotation of the motor before starting in the first embodiment, descriptions of steps S1 to steps S7 are omitted, and only the different steps will be described.

As shown in FIG. 15, the waveforms of the detection currents flowing through the phases are compared with each other, and the rotation direction is judged based on the order of the U-phase current, the V-phase current, and the W-phase current (step S11).

When it is judged that the motor 4 is rotating abnormally in the forward rotation direction, the first deceleration brake is applied to stop the rotation of the motor 4. The first deceleration brake turns off the U-phase high side transistor/V-phase high side transistor/W-phase high side transistor, turns on the U-phase low side transistor/V-phase low side transistor/W-phase low side transistor simultaneously, and maintains the simultaneous ON state until no more detection current Idc flowing through the shunt resistor Rs is detected (enforced discharge of the currents generated due to the abnormal rotation), for example.

Alternatively, as the first deceleration brake, the U-phase high side transistor → W-phase high side transistor → V-phase high side transistor may be turned on sequentially, and a load in the inverse rotation direction may be applied to the motor 4 to forcibly brake the motor 4 (step S12).

When it is judged that the motor is rotating abnormally in the inverse rotation direction, a second deceleration brake is applied to stop the rotation of the motor 4. The second deceleration brake turns on the U-phase low side transistor/V-phase low side transistor/W-phase low side transistor simultaneously and maintains the simultaneous ON state until no more detection current Idc flowing through the shunt resistor Rs is detected (enforced discharge of the currents generated due to the abnormal rotation), for example.

Alternatively, as the second deceleration brake, the U-phase high side transistor → V-phase high side transistor → W-phase high side transistor may be turned on sequentially, and a load in the forward rotation direction may be applied to the motor 4 to forcibly brake the motor 4 (step S13).

As described above, in the motor control system of the embodiment, when the abnormal rotation of the motor is detected before starting, the deceleration brake according to the rotation direction is applied. This makes it possible to promptly start a starting mode even when the abnormal rotation of the motor occurs before starting.

Figure 16:
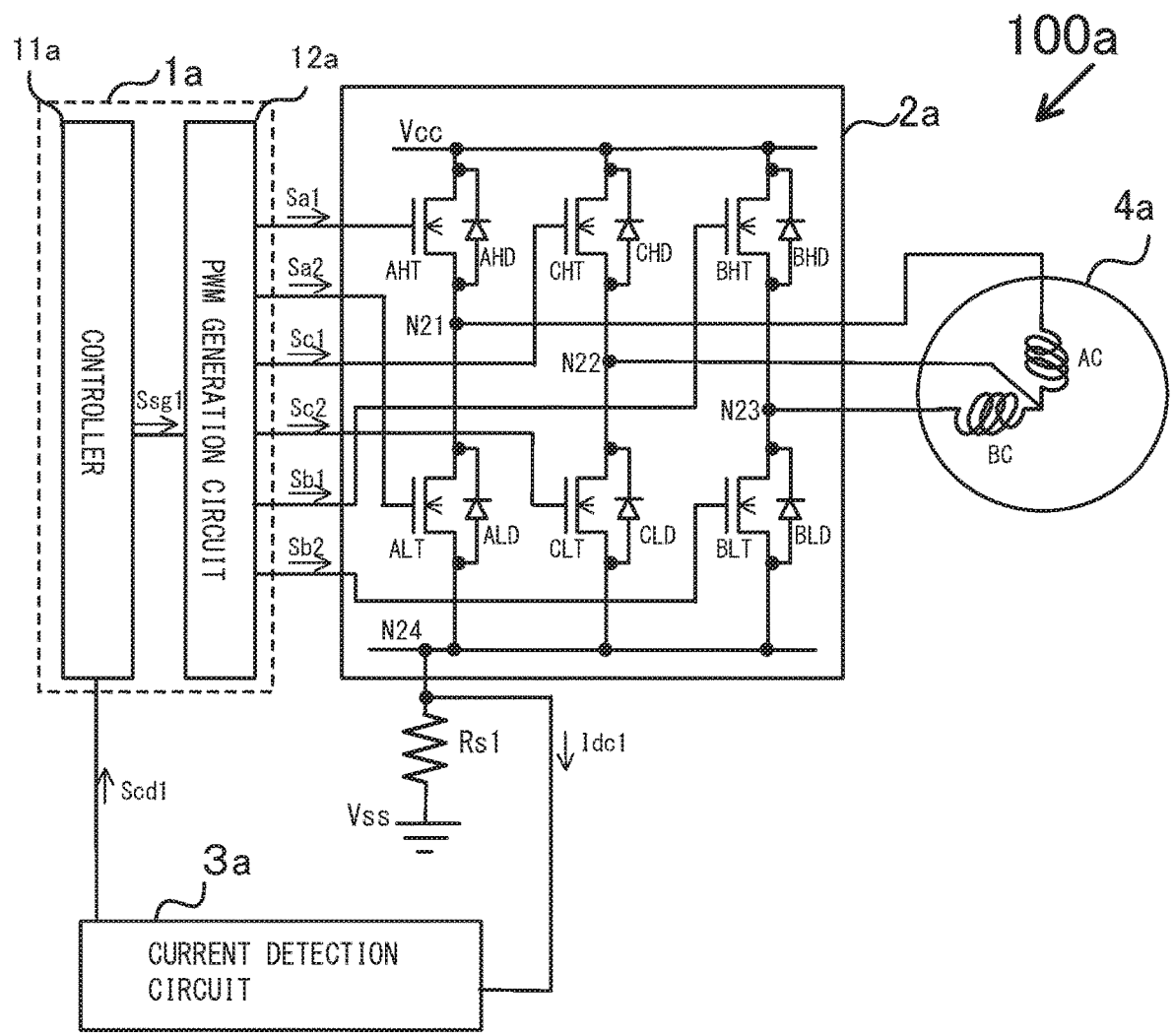
FIG. 16 is a circuit diagram showing a motor control system according to a third embodiment.

A motor control system according to the third embodiment will be described with reference to the drawings. FIG. 16 is a circuit diagram showing the motor control system.

In the third embodiment, before the starting of the motor, the detection current flowing through the shunt resistor is detected by turning on at least one of the A-phase/B-phase/common low side transistors for a predetermined period to judge whether there is the abnormal rotation of the motor, and the rotation number of the abnormal rotation of the motor is calculated based on the detection current.

As shown in FIG. 16, a motor control system 100a is provided with a one-shunt type brushless/sensorless two-phase motor and is mounted on a machine including an industrial machine and a consumer machine. The motor control system 100a includes a microcontroller 1a, an inverter 2a, a current detection circuit 3a, a motor 4a, and a shunt resistor Rs1. For example, the motor control system 100a is applied to an air conditioner with the motor 4a mounted on an outdoor unit.

The microcontroller 1a integrally controls the entirety of the motor control system 100a. The microcontroller 1a includes a controller 11a and a PWM generation circuit 12a.

At starting, driving, stopping, and before starting, the microcontroller 1a receives current detection information detected by the current detection circuit 3a as a current detection signal Scd1. The microcontroller 1a generates a control signal Ssg1 based on the current detection signal Scd1 and outputs the generated control signal Ssg1 to the PWM generation circuit 12a.

The PWM generation circuit 12a generates a triangle wave (also referred to as a reference carrier or a carrier wave) based on the control signal Ssg1, generates a control signal Sa1, a control signal Sa2, a control signal Sb1, a control signal Sb2, a control signal Sc1, and a control signal Sc2 controlling the inverter 2a based on the triangle wave and outputs the generated control signals to the inverter 2a. The control signal Sa1, the control signal Sa2, the control signal Sb1, the control signal Sb2, the control signal Sc1, and the control signal Sc2 are pulse width modulation (PWM) signals.

The motor 4a includes a coil AC, a coil BC, and a rotor (not illustrated). The coil AC is an A-phase coil and the coil BC is a B-phase coil. The motor 4a is a one-shunt type brushless/sensorless two-phase motor.

The inverter 2a includes a transistor AHT, a transistor ALT, a transistor BHT, a transistor BLT, a transistor CHT, a transistor CLT, a diode AHD, a diode ALD, a diode BHD, a diode BLD, a diode CHD, and a diode CLD.

The transistor AHT is an A-phase high side transistor. The transistor AHT is an N-channel MOS transistor. In the transistor AHT, a drain is connected to a power source Vcc, a source is connected to a node N21 (one end of the A-phase coil AC), the control signal Sa1 is inputted to a gate, and ON/OFF operation of the transistor AHT is executed based on the control signal Sa1. The transistor AHT is turned on when the control signal Sa1 is in an enable state (high level) and is turned off when the control signal Sa1 is in a disable state (low level). In the diode AHD, a cathode is connected to the drain of the transistor AHT, and an anode is connected to the source of the transistor AHT. The diode AHD is a reflux diode.

The transistor ALT is an A-phase low side transistor. The transistor ALT is an N-channel MOS transistor. In the transistor ALT, a drain (high potential side terminal) is connected to the node N21 (one end of the A-phase coil AC), a source (low potential side terminal) is connected to a node N24 (one end of a shunt resistor Rs1), the control signal Sa2 is inputted to a gate (control terminal), and ON/OFF operation of the transistor ALT is executed based on the control signal Sa2. The transistor ULT is turned on when the control signal Sa2 is in the enable state (high level) and is turned off when the control signal Sa2 is in the disable state (low level). In the diode ALD, a cathode is connected to the drain of the transistor ALT, and an anode is connected to the source of the transistor ALT. The diode ALD is a reflux diode.

The transistor BHT is a B-phase high side transistor. The transistor BHT is an N-channel MOS transistor. In the transistor BHT, a drain is connected to the power source Vcc, a source is connected to a node N23 (one end of the B-phase coil BC), the control signal Sb1 is inputted to a gate, and ON/OFF operation of the transistor BHT is executed based on the control signal Sb1. The transistor BHT is turned on when the control signal Sb1 is in the enable state (high level) and is turned off when the control signal Sb1 is in the disable state (low level). In the diode BHD, a cathode is connected to the drain of the transistor BHT, and an anode is connected to the source of the transistor BHT. The diode BHD is a reflux diode.

The transistor BLT is a B-phase low side transistor. The transistor BLT is an N-channel MOS transistor. In the transistor BLT, a drain (high potential side terminal) is connected to the node N23 (one end of the B-phase coil BC), a source (low potential side terminal) is connected to the node N24 (one end of the shunt resistor Rs1), the control signal Sb2 is inputted to a gate (control terminal), and ON/OFF operation of the transistor BLT is executed based on the control signal Sb2. The transistor BLT is turned on when the control signal Sb2 is in the enable state (high level) and turned off when the control signal Sb2 is in the disable state (low level). In the diode BLD, a cathode is connected to the drain of the transistor BLT, and an anode is connected to the source of the transistor BLT. The diode BLD is a reflux diode.

The transistor CHT is a common high side transistor. The transistor CHT is an N-channel MOS transistor. In the transistor CHT, a drain is connected to the power source Vcc, a source is connected to a node N22 (the other end of the A-phase coil AC and the other end of the B-phase coil BC), the control signal Sc1 is inputted to a gate, and ON/OFF operation of the transistor CHT is executed based on the control signal Sc1. The transistor CHT is turned on when the control signal Sc1 is in the enable state (high level) and is turned off when the control signal Sc1 is in the disable state (low level). In the diode CHD, a cathode is connected to the drain of the transistor CHT, and an anode is connected to the source of the transistor CHT. The diode CHD is a reflux diode.

The transistor CLT is a common low side transistor. The transistor CLT is an N-channel MOS transistor. In the transistor CLT, a drain (high potential side terminal) is connected to the node N22 (the other end of the A-phase coil AC and the other end of the B-phase coil BC), a source (low potential side terminal) is connected to the node N24 (one end of the shunt resistor Rs1), the control signal Sc2 is inputted to a gate (control terminal), and ON/OFF operation of the transistor CLT is executed based on the control signal Sc2. The transistor CLT is turned on when the control signal Sc2 is in the enable state (high level) and is turned off when the control signal Sc2 is in the disable state (low level). In the diode CLD, a cathode is connected to the drain of the transistor CLT, and an anode is connected to the source of the transistor CLT. The diode CLD is a reflux diode.

The inverter 2a executes ON/OFF operation of the transistor AHT, the transistor ALT, the transistor BHT, the transistor BLT, the transistor CHT, and the transistor CLT based on the control signal Sa1, the control signal Sa2, the control signal Sb1, the control signal Sb2, the control signal Sc1, and the control signal Sc2 to supply power to the motor 4a, and thereby rotates the motor 4a.

In the shunt resistor Rs1, one end is connected to the source (low potential side terminal) of the transistor ALT, the source (low potential side terminal) of the transistor BLT, and the source (low potential side terminal) of the transistor CLT, and the other end is connected to the ground potential Vss. The shunt resistor Rs1 makes a detection current Idc1 combining the current flowing through the A-phase, the current flowing through the B-phase, and the current flowing through the common coil flow toward the ground potential Vss.

In the current detection circuit 3a, a detection terminal is connected to one end side (node N24) of the shunt resistor Rs1 to detect the detection current Idc1 flowing through the shunt resistor Rs1. The current detection circuit 3a analog-digital converts the detection current Idc1, which is an analog current, and outputs the analog-digital converted detection current to the controller 11a as the current detection signal Scd1. The current detection circuit 3a detects the A-phase current, the B-phase current, and the common current flowing at starting, driving, and stopping and detects the A-phase current, the B-phase current, and the common current flowing due to the abnormal rotation of the motor 4a before starting.

Figure 17:
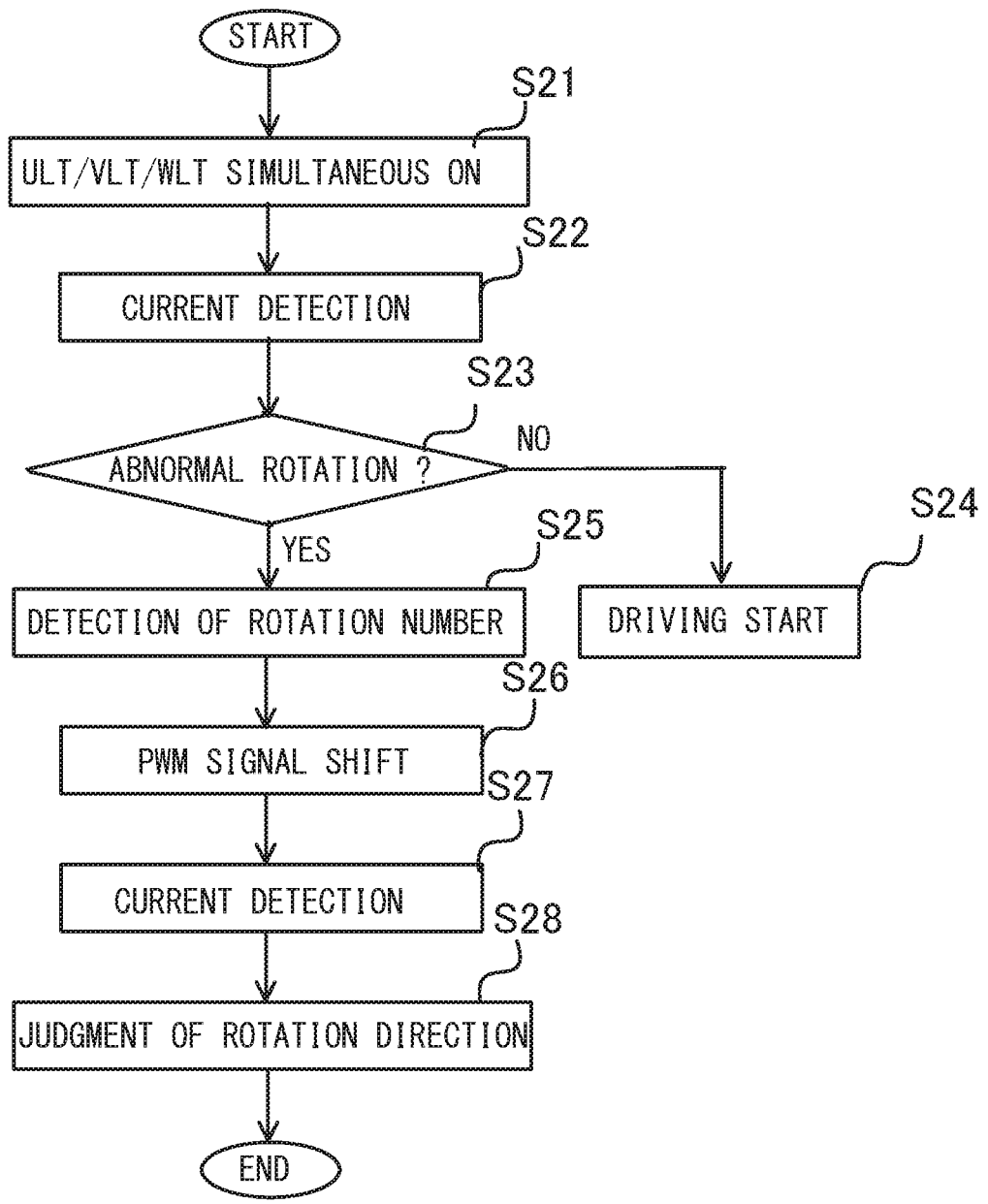
FIG. 17 is a flowchart showing detection processing of the abnormal rotation of a motor before starting according to the third embodiment.
Figure 18:
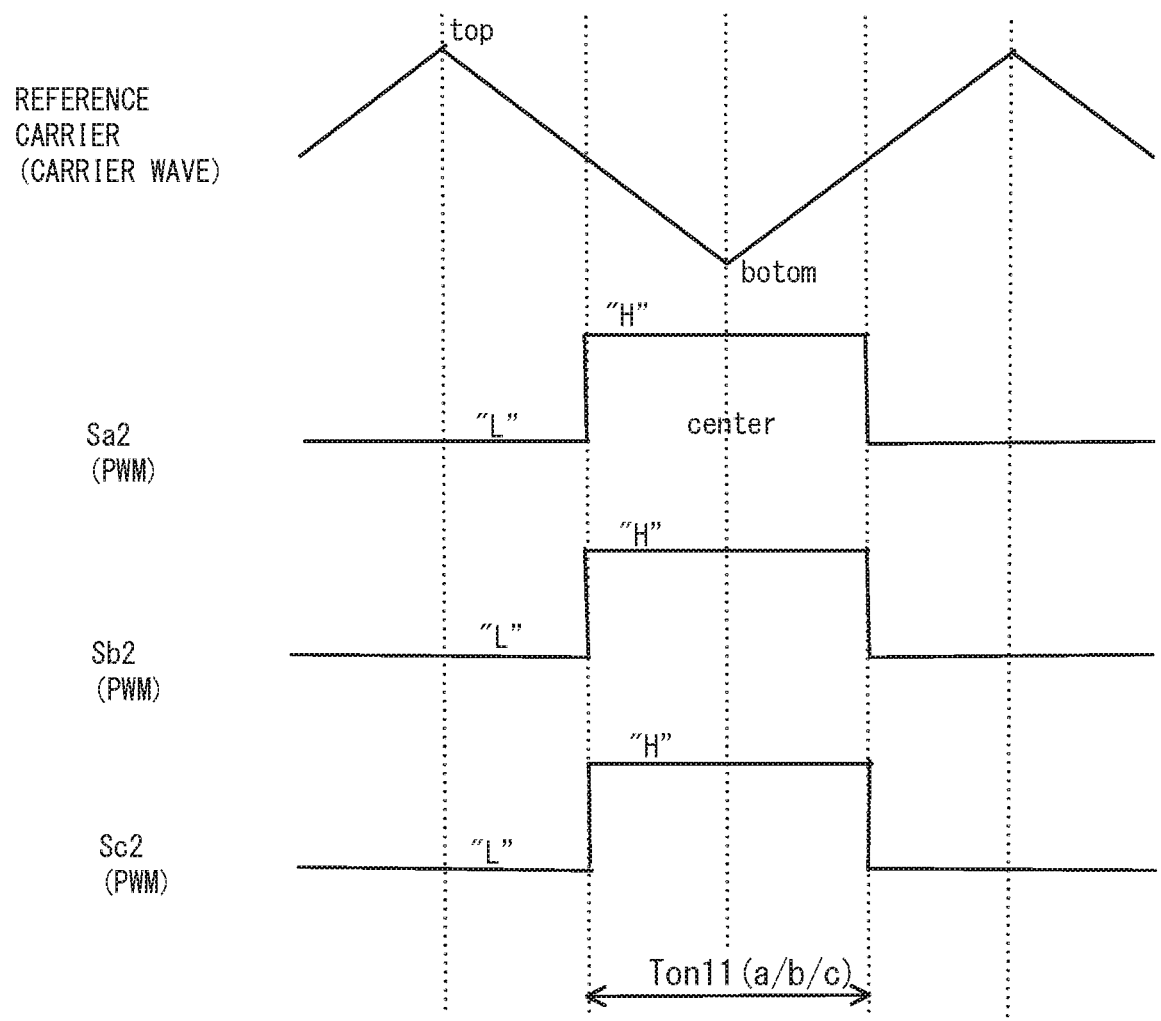
FIG. 18 is an explanatory diagram of the case where A-phase/B-phase/common transistors on the low side are turned on simultaneously according to the third embodiment.

Next, detection processing of the abnormal rotation of the motor at starting will be described with reference to FIG. 17. FIG. 17 is a flowchart showing detection processing of the abnormal rotation of a motor at starting. In this case, a motor control system 100a is applied to an air conditioner, and a motor 4a is mounted on an outdoor unit. The case where a fan of the outdoor unit is rotated due to an external cause (such as wind), and the motor 4a is being forced to rotate is expected.

As shown in FIG. 17, before the starting of the motor 4a, the A-phase high side transistor/B-phase high side transistor/common high side transistor are set to OFF state, and the A-phase low side transistor/B-phase low side transistor/common low side transistor are set to ON state for a predetermined period.

Specifically, as shown in FIG. 17, the control signal Sa2/control signal Sb2/control signal Sc2 are set to the enable state for an ON period Ton11(a/b/c) based on the reference carrier (triangle wave). The setting allows a transistor ALT/transistor BLT/transistor CLT to be turned on simultaneously (step S21).

Figure 19:
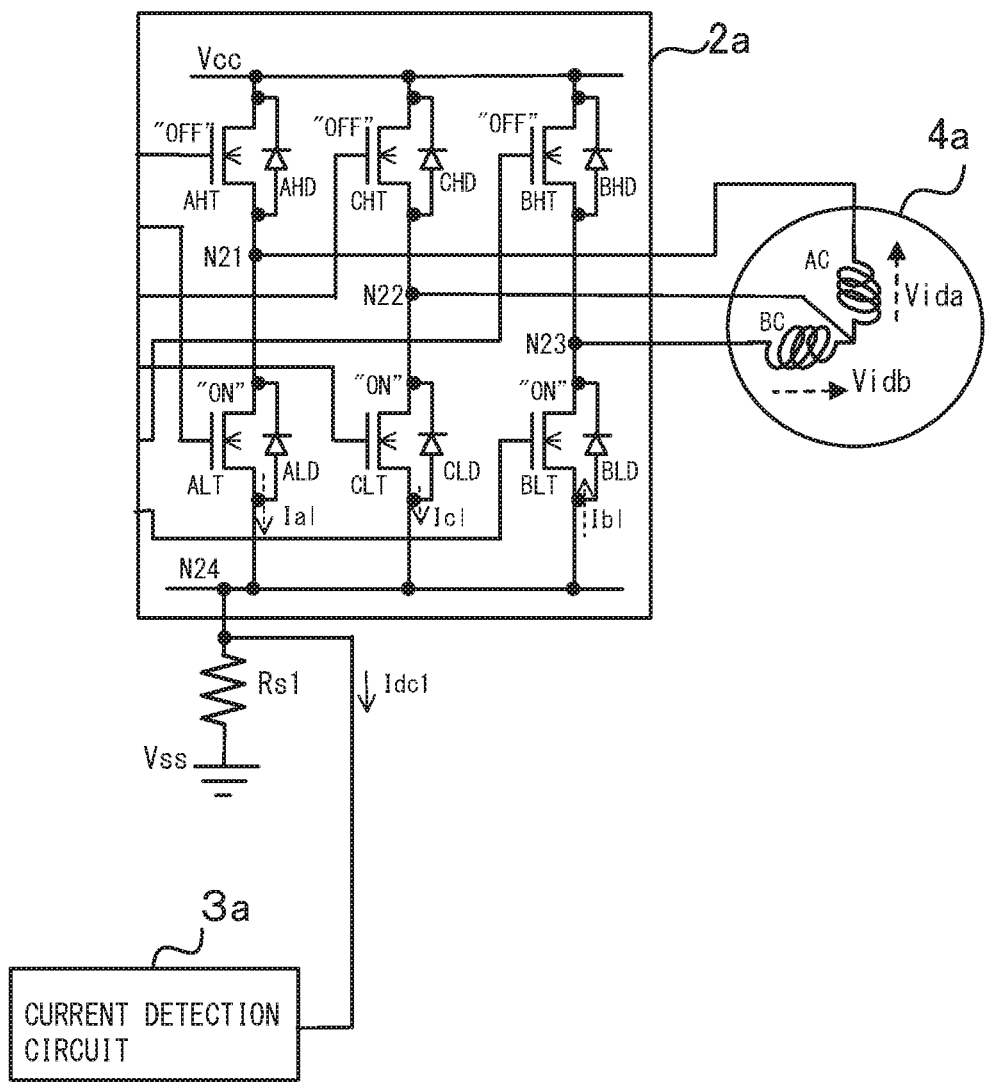
FIG. 19 is a diagram showing currents flowing through the A-phase/B-phase/common transistors on the low side in the simultaneous ON state according to the third embodiment.

Next, as shown in FIG. 19, the detection current Idc1 as the combined current including a current Ia1 as the A-phase current, a current Ib1 as the B-phase current, and a current Ic1 as the common current and flowing through the shunt resistor Rs1 in a period of the ON period Ton11(a/b/c) is detected (step S22).

Subsequently whether there is the abnormal rotation of the motor 4a is judged. Specifically, when the detection current Idc1 is not detected, it is judged that the motor 4a is being stopped, and when the detection current Idc1 is detected, it is judged that the motor 4a is rotating abnormally (step S23).

When it is judged that the motor 4a is being stopped, the motor control system 100a starts the operation start mode (step S24).

When it is judged that the motor 4a is rotating abnormally, the rotation number of the abnormal rotation of the motor 4a is calculated based on the waveform of the detection current Idc1. The bottom interval or the peak interval of the waveform of the detection current Idc1 as the combined current including the A-phase current/B-phase current/common current is calculated, and the rotation number of the abnormal rotation of the motor 4a is calculated based on the calculation result (step S25).

Figure 20:
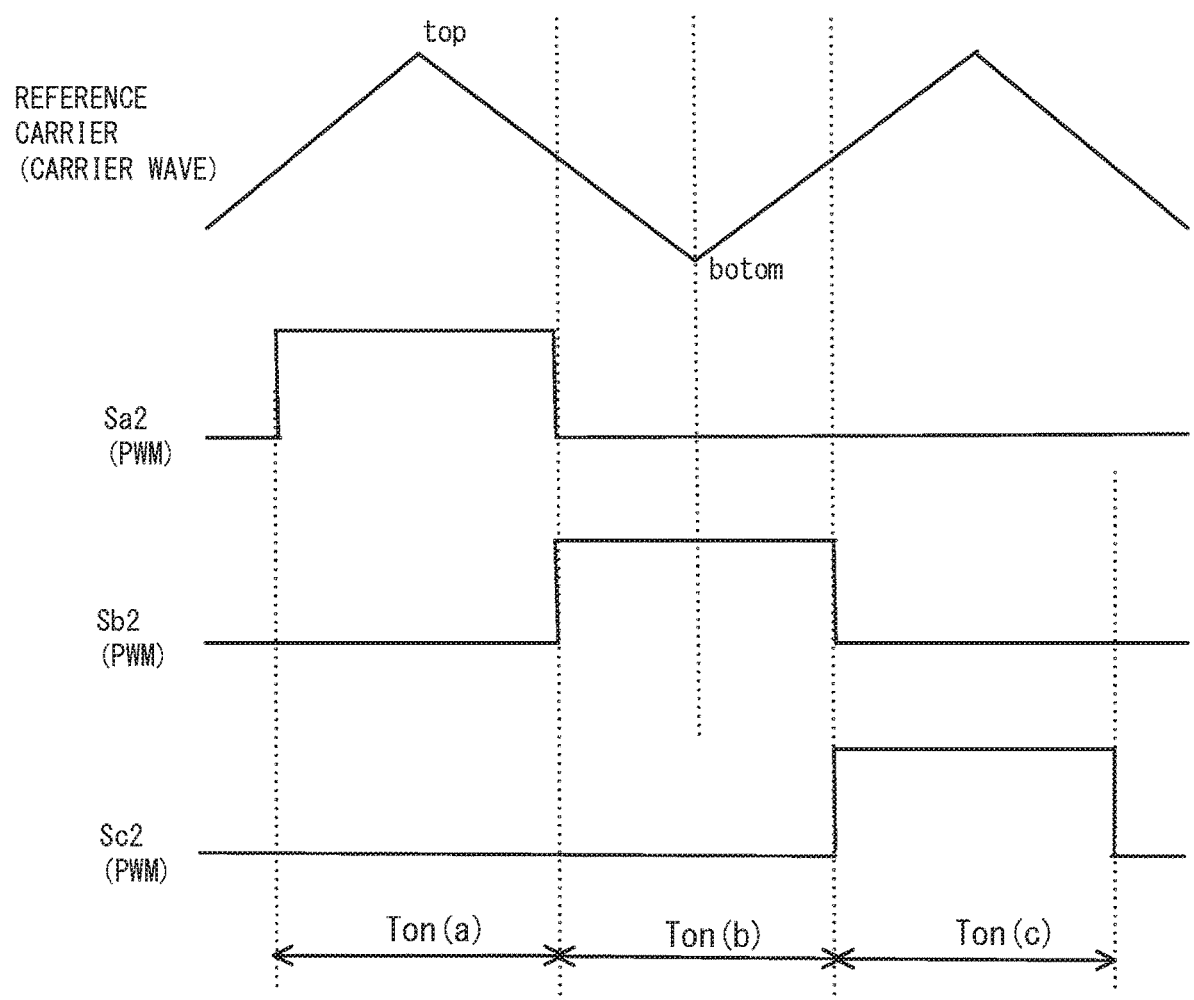
FIG. 20 is a diagram showing an example of shifting ON periods of the A-phase/B-phase/common transistors on the low side according to the third embodiment.

Next, as shown in FIG. 20, the A-phase high side transistor/B-phase high side transistor/common high side transistor are set to the OFF state, and the ON periods of the A-phase low side transistor/B-phase low side transistor/common low side transistor are set sequentially.

Specifically, the control signal Sa2 is set to the enable state for the ON period Ton(a) to turn on the transistor ALT, the control signal Sb2 is set to the enable state for the ON period Ton(b) immediately after the end of the ON period Ton(a) to turn on the transistor BLT, and the control signal Sc2 is set to the enable state for the ON period Ton(c) immediately after the end of the ON period Ton(b) to turn on the transistor CLT (step S26).

Subsequently, the current Ia1 flowing through the A-phase, the current Ib1 flowing through the B-phase, and the current Ic1 flowing through the common coil are each detected as the detection current Idc1 flowing through the shunt resistor Rs1 (step S27).

The rotation direction of the abnormal rotation of the motor 4a is judged based on the current waveform of the current Ia1 flowing through the A-phase, the current waveform of the current Ib1 flowing through the B-phase, and the current waveform of the current Ic1 flowing through the common coil (step S28).

As described above, the motor control system 100a of the embodiment is provided with a microcontroller 1a, an inverter 2a, a current detection circuit 3a, the motor 4a, and the shunt resistor Rs1. The motor 4a is a one-shunt type brushless/sensorless two-phase motor. The current detection circuit 3a detects the A-phase current, the B-phase current, and the common current using the shunt resistor Rs1. Before the starting of the motor 4a, at least one of all the low side transistors is turned on for the ON period Ton11 and detection of the detection current Idc1 flowing through the shunt resistor Rs1 is performed. When the detection current Idc1 is detected, it is judged that the motor 4a is rotating abnormally, and the rotation number of the motor 4a is calculated based on the waveform of the detection current Idc1. When the detection current Idc1 is not detected, it is judged that the motor 4a is being stopped. Before the starting of the motor 4a, the current flowing through the A-phase low side transistor, the current flowing through the B-phase low side transistor, and the current flowing through the common low side transistor are detected sequentially by turning on the A-phase low side transistor/B-phase low side transistor/common low side transistor sequentially, and the rotation direction of the abnormal rotation of the motor 4a is judged based on the order of the current waveform.

Thus, it is possible to precisely grasp the state of the motor 4a at starting, driving, and stopping and the abnormality of the motor 4a before starting, with the number of the parts of the motor control system 100a reduced.

Although the detection current Idc1 flowing through the shunt resistor Rs1 is detected by turning on the A-phase low side transistor/B-phase low side transistor/common low side transistor simultaneously for a predetermined period, and the judgement of whether there is the abnormal rotation of the motor 4a based on the detection current Idc1 and the calculation of the rotation number at the abnormal rotation of the motor are performed in the third embodiment, the embodiment is not necessarily limited to the above case. For example, the ON periods of the A-phase low side transistor/B-phase low side transistor/common low side transistor may be shifted sequentially to detect the detection current Idc1 flowing through the shunt resistor Rs1, and the judgement of whether there is the abnormal rotation of the motor 4a, the calculation of the rotation number of the motor 4a during the abnormal rotation, and the judgement of the direction of the abnormal rotation of the motor 4a may be executed simultaneously based on the detection current Idc1 flowing through the A-phase/B-phase/common coil.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor control system, comprising:
an inverter including a plurality of high side transistors and a plurality of low side transistors and configured to supply power to a motor to rotate the motor,
a pulse width modulation (PWM) generation circuit configured to generate a PWM signal for controlling an ON/OFF operation of each of the high side transistors and the low side transistors and to output the PWM signal to the inverter,
a shunt resistor including one end connected to a plurality of low potential side terminals of the low side transistors and another end connected to a ground potential, and
a current detection circuit configured to detect a current flowing through the shunt resistor,
wherein the current detection circuit detects an abnormal rotation of the motors before starting of the motor, and detects a first detection current flowing through the shunt resistor after at least one of all the low side transistors is turned on for a first period before starting of the motor,
when the first detection current is detected, the motor control system judges that the motor is rotating abnormally, and calculates a rotation number of the motor based on a waveform of the first detection current,
when the first detection current is not detected, the motor control system judges that the motor is stopped.

2. The motor control system according to claim 1,
wherein the motor at least includes a first phase coil and a second phase coil, and when it is judged that the motor is rotating abnormally, the motor control system before the starting of the motor detects a second detection current flowing through the shunt resistor by turning on a first phase low side transistor connected to the first phase coil for a second period, and detects a third detection current flowing through the shunt resistor by turning on a second phase low side transistor connected to the second phase coil for a third period continuous from or overlapping with the second period, and a rotation direction of the motor is judged based on the order of or the phase difference between a waveform of the second detection current and a waveform of the third detection current.

3. The motor control system according to claim 1,
wherein when it is judged that the motor is rotating abnormally, a current flowing through the shunt resistor is detected by turning off all the high side transistors and turning on all the low side transistors, and the low side transistors are turned off after no more current flowing through the shunt resistor is detected.

4. The motor control system according to claim 1, further comprising:
a controller configured to receive current detection information detected by the current detection circuit and to output a control signal to the PWM generation circuit based on the current detection information.

5. The motor control system according to claim 4, wherein the controller and the PWM generation circuit are provided to a microcontroller.

6. The motor control system according to claim 2,
wherein when it is judged that the motor is rotating abnormally in a direction inverse to a forward rotation, a load in a forward rotation direction is applied to the motor to forcibly brake the motor.

7. The motor control system according to claim 1,
wherein the motor includes a U-phase coil, a V-phase coil, and a W-phase coil, and the inverter includes a U-phase high side transistor, a U-phase low side transistor, a V-phase high side transistor, a V-phase low side transistor, a W-phase high side transistor, and a W-phase low side transistor.

8. The motor control system according to claim 7,
wherein a reflux diode is provided to each of the U-phase high side transistor, the U-phase low side transistor, the V-phase high side transistor, the V-phase low side transistor, the W-phase high side transistor, and the W-phase low side transistor.

9. The motor control system according to claim 1,
wherein the motor includes an A-phase coil and a B-phase coil, and the inverter includes an A-phase high side transistor, an A-phase low side transistor, a B-phase high side transistor, a B-phase low side transistor, a common high side transistor, and a common low side transistor.

10. The motor control system according to claim 9,
wherein a reflux diode is provided to each of the A-phase high side transistor, the A-phase low side transistor, the B-phase high side transistor, the B-phase low side transistor, the common high side transistor, and the common low side transistor.

11. The motor control system according to claim 1, wherein the motor is a brushless/sensorless motor.

12. The motor control system according to claim 1, wherein the motor control system is applied to an air conditioner, and the motor is mounted on an outdoor unit.

* * * * *